(12) United States Patent
Saida

(10) Patent No.: US 8,477,392 B2
(45) Date of Patent: Jul. 2, 2013

(54) IMAGE SCANNING APPARATUS AND IMAGE PROCESSING SYSTEM

(75) Inventor: Yukihiro Saida, Tokyo (JP)

(73) Assignee: Oki Data Corporation, Tokyo (JP)

( * ) Notice: Subject to any disclaimer, the term of this patent is extended or adjusted under 35 U.S.C. 154(b) by 428 days.

(21) Appl. No.: 12/819,450

(22) Filed: Jun. 21, 2010

(65) Prior Publication Data

US 2010/0328739 A1 Dec. 30, 2010

(30) Foreign Application Priority Data

Jun. 25, 2009 (JP) ................................ 2009-151394

(51) Int. Cl.
*H04N 1/04* (2006.01)

(52) U.S. Cl.
USPC ............ 358/498; 358/474; 358/496; 271/4.1; 271/3.14

(58) Field of Classification Search
USPC ................. 358/474, 406, 497, 496, 501, 498, 358/437, 1.13; 271/4.1, 3.14, 258.01, 3.16
See application file for complete search history.

(56) References Cited

U.S. PATENT DOCUMENTS

| | | | | |
|---|---|---|---|---|
| 4,657,372 A * | 4/1987 | Ikeda et al. | ...................... | 399/13 |
| 4,739,983 A * | 4/1988 | Ide et al. | ........................ | 271/233 |
| 5,168,307 A * | 12/1992 | Masuda et al. | .................. | 355/57 |
| 5,459,552 A * | 10/1995 | Ohira | .................. | 399/1 |
| 5,710,634 A * | 1/1998 | Kuriyama et al. | ............ | 358/296 |
| 5,745,661 A * | 4/1998 | Koh et al. | ..................... | 358/1.14 |
| 6,035,156 A * | 3/2000 | Okamoto et al. | ............... | 399/82 |
| 6,078,762 A * | 6/2000 | Fuchiwaki et al. | ............. | 399/94 |
| 6,243,350 B1 * | 6/2001 | Knight et al. | ................. | 369/126 |
| 6,332,609 B1 * | 12/2001 | Arakawa | ....................... | 271/157 |
| 6,354,584 B1 * | 3/2002 | Suga et al. | ................. | 271/10.12 |
| 6,382,858 B1 * | 5/2002 | Nojima et al. | ................ | 400/691 |
| 6,442,368 B1 * | 8/2002 | Ohtsuka et al. | ............... | 399/382 |
| 6,533,263 B2 * | 3/2003 | Tamura | ....................... | 271/10.01 |
| 7,722,026 B2 * | 5/2010 | Hirate et al. | ............... | 271/10.02 |

* cited by examiner

*Primary Examiner* — Negussie Worku
(74) *Attorney, Agent, or Firm* — Marvin A. Motsenbocker; MOTS Law, PLLC

(57) ABSTRACT

A aspect of the invention is an image scanning apparatus including: a document feeder configured to sequentially feed document sheets stacked in the document feeder; an image scanning unit configured to scan the document sheets fed by the document feeder and to output image data thereof; a memory configured to store therein the image data; a detector configured to detect a failure of feeding the document sheets by the document feeder; a notifier configured to report the feeding failure when the detector detects the feeding failure; and a display unit configured to display the image data stored in the memory, upon detection of the feeding failure.

7 Claims, 24 Drawing Sheets

IMAGE SCANNING APPARATUS AND IMAGE PROCESSING SYSTEM

CROSS REFERENCE TO RELATED APPLICATIONS

This application claims priority based on 35 USC 119 from prior Japanese Patent Application No. P2009-151394 filed on Jun. 25, 2009, entitled "Image Scanning Apparatus and Image Processing System", the entire contents of which are incorporated herein by reference.

BACKGROUND OF THE INVENTION

1. Field of the Invention

The invention relates to an image scanning apparatus and an image processing system.

2. Description of Related Art

A conventional image scanning apparatus such as a scanner includes: an image scanning unit configured to generate image data by scanning a document; a compressor configured to compress the generated image data to create compressed data; a memory configured to temporarily store therein the compressed data; a volume adjustor configured to adjust the image volume (the image size) of the compressed data stored in the memory so as to create image data object to be sent. The image scanning apparatus sends the image data object to be sent as an attached file of an e-mail (see, for example, Japanese Patent Application Laid-Open No. 2003-16017). A function that transmits image data that were scanned as an attached file of an e-mail is referred to as a Scan-To-Email function.

SUMMARY OF THE INVENTION

The conventional image scanning apparatus described above does not detect a document feeding failures such as an overlapped feed and thus may send incomplete image data.

A first aspect of the invention is an image scanning apparatus including: a document feeder configured to sequentially feed document sheets stacked in the document feeder; an image scanning unit configured to scan the document sheets fed by the document feeder and to output image data thereof; a memory configured to store therein the image data; a detector configured to detect a failure of feeding the document sheets by the document feeder; a notifier configured to report the feeding failure when the detector detects the feeding failure; and a display unit configured to display the image data stored in the memory, upon detection of the feeding failure.

A second aspect of the invention is an image processing system including an image scanning apparatus and an image processing apparatus. The image scanning apparatus includes: a document feeder configured to sequentially feed document sheets stacked in the document feeder; an image scanning unit configured to scan the document sheets fed by the document feeder and to output image data thereof; a transfer unit configured to transfer the image data output by the image scanning unit to the image processing apparatus; a detector configured to detect a feeding failure of the document sheets; a notifier configured to report the feeding failure when the detector detects the feeding failure; a display unit configured to, when the detector detects the feeding failure, obtain the image data from the document processing apparatus and to display the image data; an edit information input unit configured to receive an input of editing information for editing the image data of the document sheets output by the image scanning unit, as the display unit displays the image data; an image re-scanning unit configured to scan one or more sheets of the document that are returned to and re-fed by the document feeder and to output re-scanned image data thereof; and an informer configured, when the edit information input unit receives the input of the edit information, to inform the image processing apparatus of the edit information. The image processing apparatus includes: a memory configured to store therein the image data transferred from the image scanning apparatus; a reply unit configured, when the image scanning apparatus requests the image data, to transmit the image data to the image scanning apparatus; an editor configured, when being informed of the edit information by the informer of the image scanning apparatus, to edit, based on the edit information, the image data stored in the memory using the re-scanned image data output by the image re-scanning unit; and an output unit configured to output to an external apparatus the edited image data edited by the editor.

A third aspect of the invention is an image processing system including an image scanning apparatus and an image forming apparatus. The image scanning apparatus includes: a document feeder configured to sequentially feed document sheets, stacked in the document feeder; an image scanning unit configured to scan the document sheets fed by the document feeder and to output image data thereof; a transfer unit configured to transfer the image data output from the image scanning unit to the image forming apparatus; a detector configured to detect a feeding failure of the document sheets; a notifier configured to report the feeding failure when the detector detects the feeding failure; a display unit configured to, when the detector detects the feeding failure, obtain the image data from the image forming apparatus and to display the image data; an edit information input unit configured to receive an input of editing information for editing the image data of the document sheets output from the image scanning unit, as the display unit displays the image data; an image re-scanning unit configured to scan one or more sheets of the document that are returned to and re-fed by the document feeder after the edit information input unit receives the input of the edit information and to output re-scanned image data thereof; and an informer configured, when the edit information input unit receives the input of the edit information, to inform the image forming apparatus of the edit information. The image forming apparatus includes: a memory configured to store therein the image data transferred from the image scanning apparatus; a reply unit configured, when the image scanning apparatus requests the image data, to transmit the image data to the image scanning apparatus; an editor configured, when being informed of the edit information by the informer of the image scanning apparatus, to edit, based on the edit information, the image data stored in the memory using the re-scanned image data output by the image re-scanning unit; and an output unit configured to print the edited image data edited by the editor.

According to the image scanning apparatus of the first aspect of the invention, when a feeding failure of the document sheets such as an overlapped feed occurs, it is reported to the user. Therefore, the image scanning apparatus of the first aspect prevents transmission of incomplete image data.

According to the image processing system of the second aspect or the third aspect, when the number of document sheets scanned by the image scanning unit is less than the number of document sheets that the user intended to scan, the image scanning apparatus informs the user of that failure and instructs the user to return one or more sheets of the document that were not scanned by the image scanning unit. When the image scanning apparatus re-scans the one or more unscanned sheets to create image data thereof, the image processing apparatus or the image forming apparatus edits the scanned image data using the re-scanned image data and outputs the edited image data.

Therefore, when a feeding failure occurs, the user can identify the one or more sheets of the document that were not scanned correctly and cause the image scanning apparatus to scan them again and to output (for example, e-mail, print, fax, or etc.) the edited image data. This shortens the time for scanning the document sheets.

DETAILED DESCRIPTION OF THE EMBODIMENTS

Figure 1:
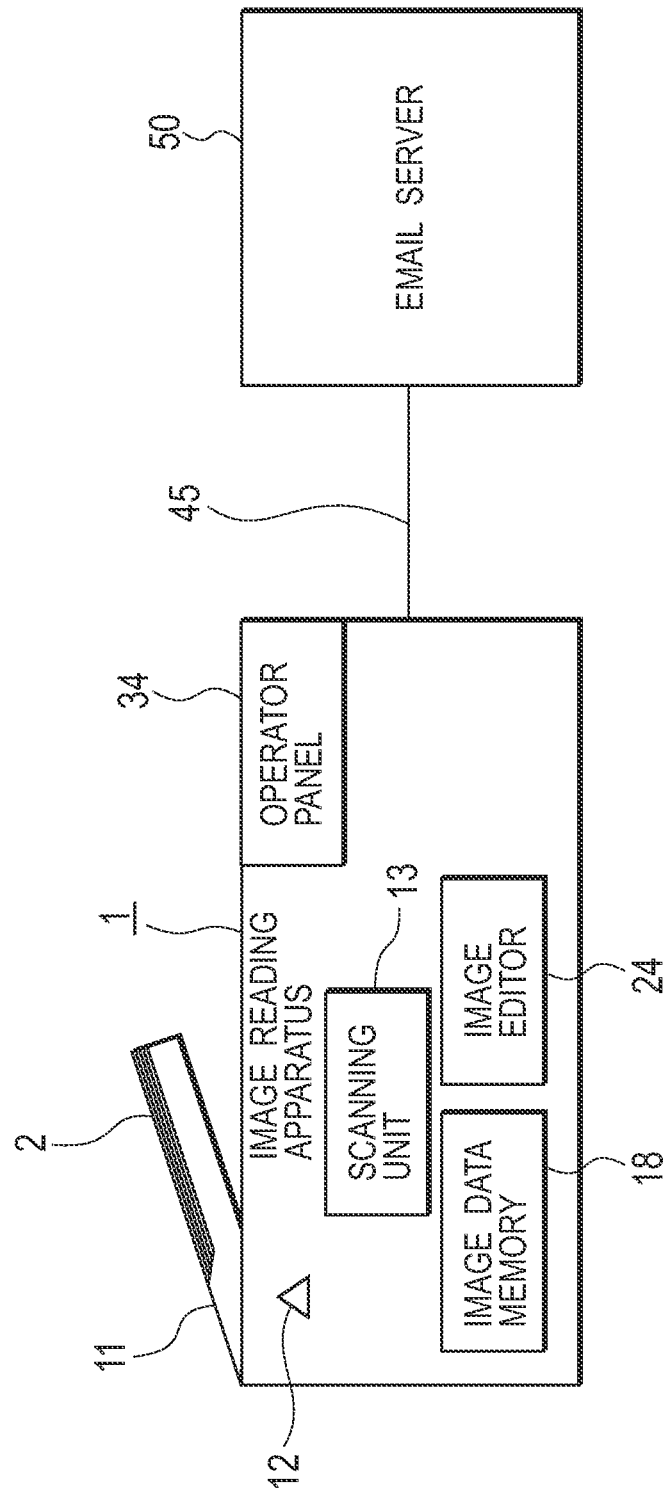
FIG. 1 is a configuration diagram illustrating an outline of an image processing system of a first embodiment of the invention.

Descriptions are provided herein below for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

Configuration of First Embodiment

FIG. 1 is a configuration diagram of an image processing system of a first embodiment of the invention.

The image processing system includes image scanning apparatus 1 and email server 50 connected to image scanning apparatus 1 via network cable 45.

Image scanning apparatus 1 includes: automatic document feeder 11 (hereinafter, referred to as "ADF") (serving as a document feeder) configured to sequentially feed stacked document sheets 2; sensor 12 configured to detect document sheet 2 for managing scanning timing; scanning unit 13 (serving as an image scanning unit and an image re-scanning unit) configured to scan and/or re-scan the documents; image data memory 18 (serving as a storage), such as a RAM (Random Access Memory), to store therein image data from scanning unit 13; operator panel 34 configured to display the status of image scanning apparatus 1 to users and to receive input from users; image editor 24 (serving as an editor) configured to edit the image data stored in image data memory 18; and the like. Operator panel 34 also functions as a notifier to report a feeding failure and functions as a display unit to display the feeding failure.

Email server 50 includes an image data memory, a communication unit, and a central processing unit (hereinafter, referred to as "CPU") configured with programs to control the overall operation of email server 50.

Figure 2:
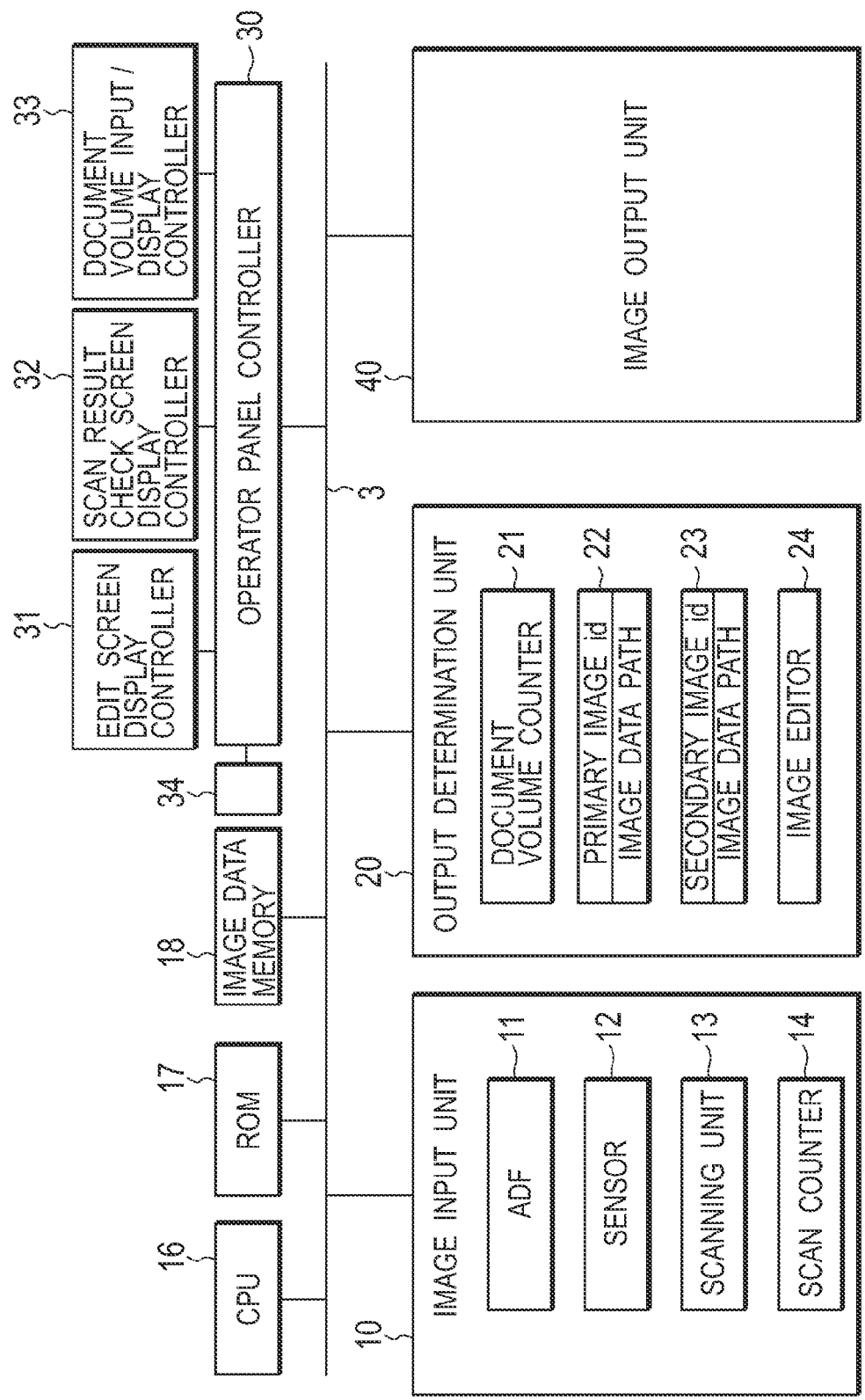
FIG. 2 is a configuration diagram of image scanning apparatus 1 shown in FIG. 1.

FIG. 2 is a configuration diagram of image scanning apparatus 1 shown in FIG. 1.

Image scanning apparatus 1 includes internal bus 3. Connected to internal bus 3 are: image input unit 10 configured to control scanning of document sheets 2; CPU 16 configured to control the overall operation of the apparatus with programs; ROM (Read Only Memory) 17 storing therein the programs; image data memory 18 configured to store therein the image data scanned by image input unit 10; output determination unit 20 (serving as a detector) configured to determine whether or not the image data created by image input unit 10 is to be output to an external device (external apparatus), that is, configured to detect and determine whether or not a document feeding failure has occurred; operator panel controller 30 configured to control operator panel 34; image output unit 40 configured to output the image data to the external device when output determination unit 20 determines that the image data is to be transmitted; and the like. Connected to operator panel controller 30 are: edit screen display controller 31, scan result check screen display controller 32, and document volume input/display controller 33 configured to control the display of operator panel 34 of various types and to monitor input from the user.

Image input unit 10 includes: ADF 11 configured to convey document sheets 2; sensor 12 configured to monitor the conveyance of document sheets 2; scanning unit 13 configured to scan document sheets 2; and scan counter 14 (serving as a counter) configured to count the number of document sheets 2 that are scanned by scanning unit 13. Image output determination unit 20 includes: document volume counter 21 configured to hold the number of document sheets to be scanned, which is communicated by document volume input/display controller 33; and image editor 24 configured to edit the image data that are stored in image data memory 18 on the basis of an editing instruction from edit screen display controller 31. Image output determination unit 20 further includes: an image data path (directory) specifying the place where primary image data, which are primarily scanned by image input unit 10, are stored in image data memory 18; an image data path (directory) specifying the place where secondary image data, which are re-scanned (secondarily scanned) by image input unit 10, are temporarily stored in image data memory 18; and image IDs based on which output determination unit 20 manages the image data paths, the image IDs including primary image ID 22 for the primary image data and secondary image ID 23 for the secondary image data.

Figure 3:
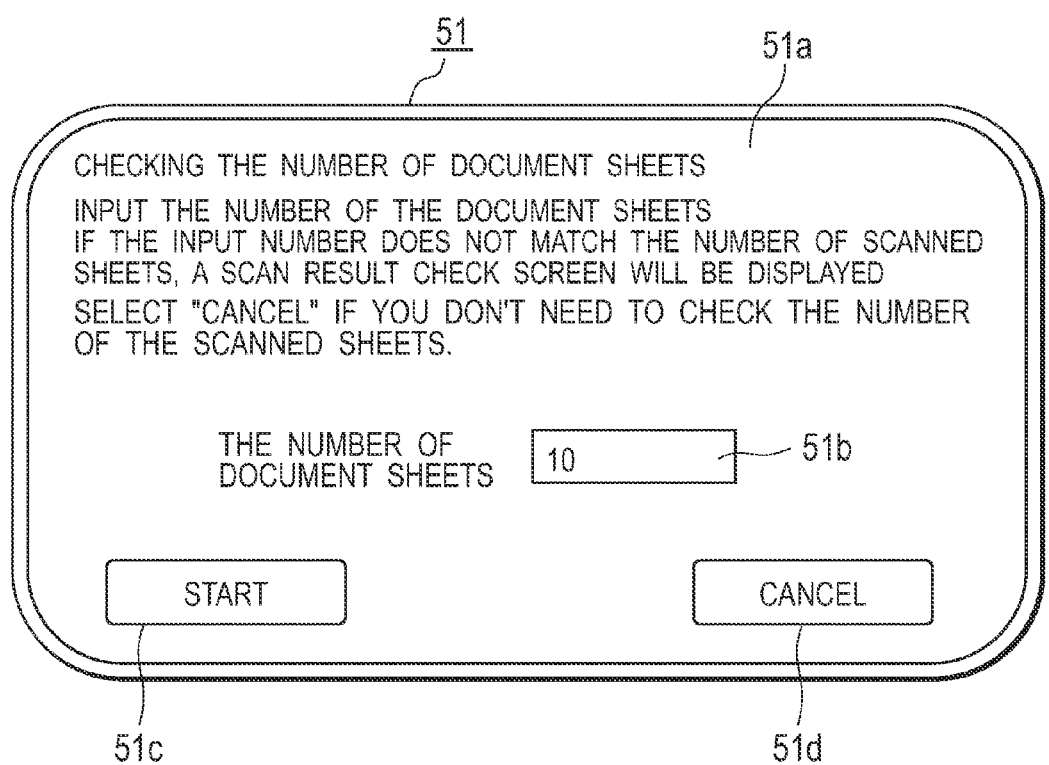
FIG. 3 is a view of a display example of a document volume input screen of image scanning apparatus 1 of FIG. 2.

FIG. 3 is a view of a display example of a counter input unit (for example, document volume input screen 51) of image scanning apparatus 1 of FIG. 2.

Specifically, FIG. 3 illustrates an example of document volume input screen 51 to let the user input the number of document sheets before executing Scan-To-Email. Document volume input screen 51 includes: main screen 51a to prompt the user to input the number of document sheets; input button 51b (serving as a document volume display unit) to display the number of the document sheets that is input with a numerical keypad or the like; start button 51c (serving as a start request reception unit) to receive a start instruction from the user; and cancel button 51d (serving as a cancel request reception unit) to receive an instruction of canceling the corresponding function.

Figure 4:
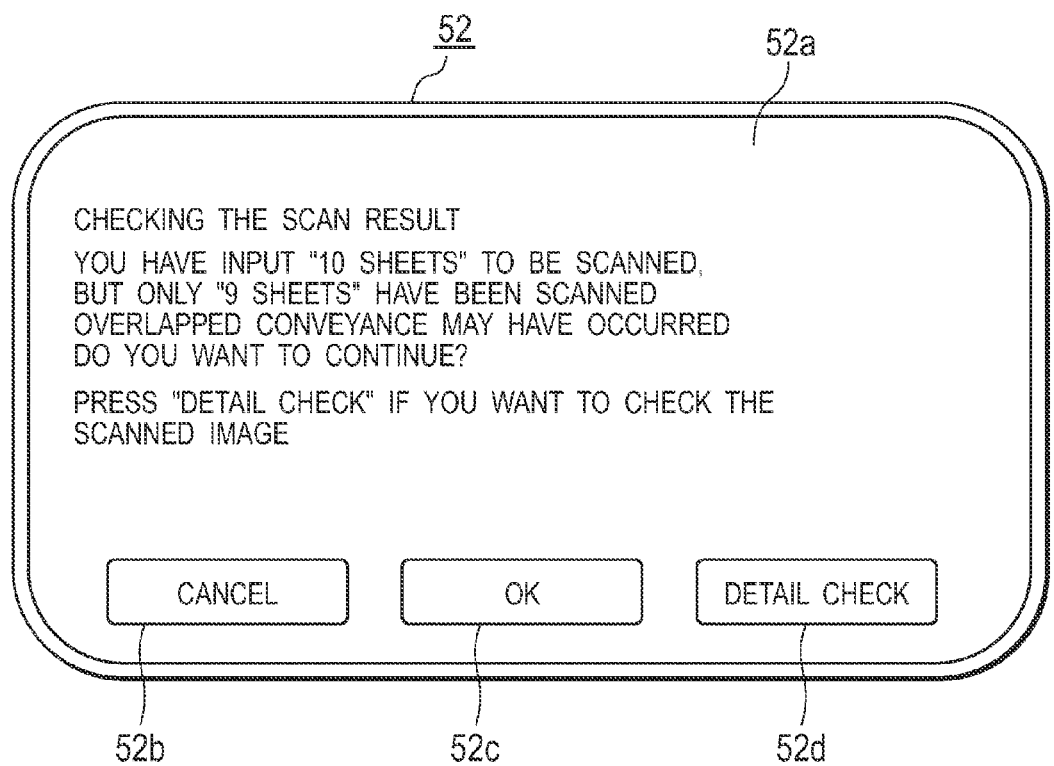
FIG. 4 is a view of a display example of the scan result check screen of image scanning apparatus 1 of FIG. 2

FIG. 4 is a view of a display example of the scan result check screen of image scanning apparatus 1 of FIG. 2.

Specifically, FIG. 4 illustrates an example of scan result check screen 52 which is to be displayed when the number of document sheets that are actually scanned by scanning unit 13 is different from the number of document sheets that is input by the user with document volume input screen 51. Scan result check screen 52 includes main screen 52a to prompt the user to confirm the scan result; cancel button 52b to receive an instruction for cancelling an e-mail transmission; OK button 52c to receive an instruction for executing the e-mail transmission; and detail check button 52d to receive an instruction for displaying the detail of the scan result. Scan result check screen 52 also functions as a notifier to report a feeding failure and functions as a display unit to display the feeding failure.

Figure 5:
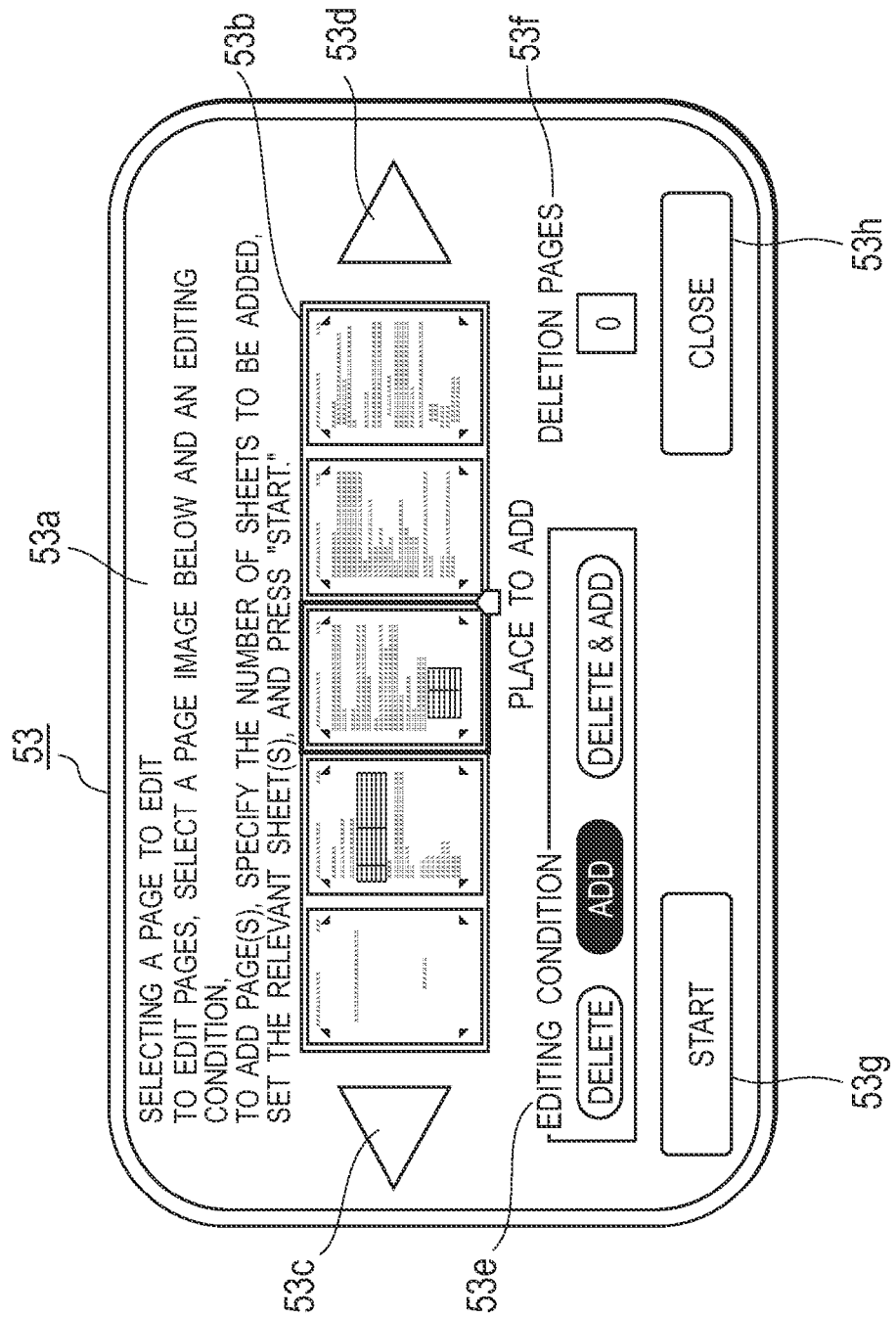
FIG. 5 is a view of a display example of an edit screen of image scanning apparatus 1 of FIG. 2.

FIG. 5 is a view of a display example of an edit information input unit (for example, edit screen 53) of image scanning apparatus 1 of FIG. 2.

Specifically, FIG. 5 illustrates an example of edit screen 53 which is to be displayed when detail check button 52d in scan result check screen 52 is pressed. Edit screen 53 includes: main screen 53a displaying messages to guide and prompt the user to execute page editing; image display area 53b to display the scanned image in a thumb-nailed form; left arrow key 53c to scroll the viewed area of the scanned images toward the first page; right arrow key 53d to scroll the viewed area of the scanned images toward the last page; editing condition button 53e (or processing condition button) to select one of editing types (editing conditions) such as deleting, adding, or adding & deleting; deletion page amount button 53f (serving as a deletion page amount display) to display a deletion page amount (the number of pages to be deleted from the scanned images) that is input by the user with the numerical keypad or the like; start button 53g to receive an instruction to start editing under a condition according to the selected editing condition and the selected deletion page amount; and close button 53h to end without executing the corresponding editing process.

Scan-to-Email Process of First Embodiment

Figure 6:
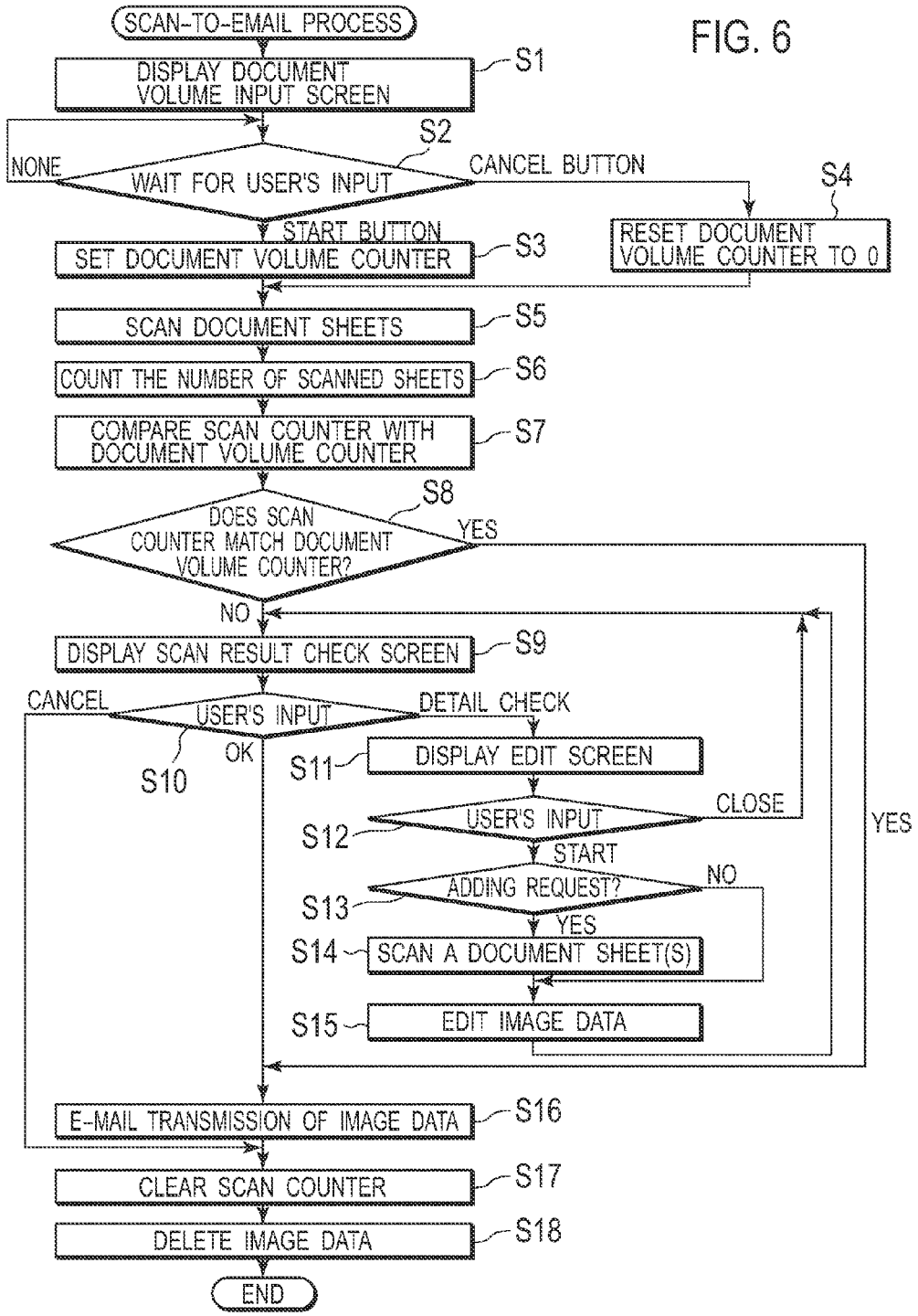
FIG. 6 is an outline flowchart of a scanning process (scan-to-email process) of the image processing system shown in FIGS. 1 and 2.

FIG. 6 is a flowchart of the scanning process (scan-to-email process) in the image processing system shown FIGS. 1 and 2.

When the user instructs image scanning apparatus 1 shown in FIGS. 1 and 2 to execute the scan-to-email process by using operator panel 34, operator panel controller 30 informs output determination unit 20 that the scan-to-email process is started. Upon being informed that the scan-to-email process is started, output determination unit 20 instructs operator panel controller 30 to display document volume input screen 51 of FIG. 3. Upon being instructed to display document volume input screen 51, operator panel controller 30 instructs document volume input/display controller 33 to display document volume input screen 51 of FIG. 3. Upon being instructed to display document volume input screen 51, document volume input/display controller 33 displays document volume input screen 51 on operator panel 34 (step S1).

Then, document volume input/display controller 33 waits for an input to input button 51b (serving as the document volume display) and an input to start button 51c (serving as a start request receiving/displaying part) by the user or waits for an input to cancel button 51d (serving as a cancel request receiving/displaying part) by the user (step S2).

When document volume input/display controller 33 detects that start button 51c is pressed, document volume input/display controller 33 instructs output determination unit 20 to count the input from input button 51b by the user and to start to check the number of scanned document sheets. Upon being instructed to start to check the number of the scanned document sheets, output determination unit 20 sets document volume counter 21 to an input value input from input button 51b (step S3). On the other hand, when document volume input/display controller 33 detects that cancel button 51d is pressed, document volume input/display controller 33 instructs output determination unit 20 to cancel checking the number of scanned document sheets. Then, output determination unit 20 sets document volume counter 21 to zero (step S4).

After that, output determination unit 20 instructs image input unit 10 to scan the document sheets. Upon being instructed to scan the document sheets, image input unit 10 controls ADF 11, sensor 12, and scanning unit 13 to scan the document sheets (step S5) and stores the image data to image data memory 18. At the same time, image input unit 10 monitors sensor 12 and then increments scan counter 14 by one every time sensor 12 turns on from an off state in order to count the number of scanned sheets (step S6).

When determining that scanning of the last sheet of the document is completed, image input unit 10 informs output determination unit 20 of the completion of scanning, of the image data path information for identifying the image data stored in image data memory 18, and of the value of scan counter 14. Then, output determination unit 20 generates an image ID as primary image ID 22 and stores primary image ID 22 in such a manner that primary image ID 22 is associated with the informed image data path information. After that, output determination unit 20 compares the informed value of scan counter 14 with the count value of document volume counter 21 (step S8).

When document volume counter 21 is zero or when the count value of scan counter 14 is the same as the count value of document volume counter 21 (YES), output determination unit 20 obtains the image data from image data memory 18 and instructs image output unit 40 to transmit the image data by e-mail (step S16). When output determination unit 20 determines that all the data in image data memory 18 are completely sent, output determination unit 20 clears scan counter 14 (step S17) and deletes the image data stored in image data memory 18 (step S18), and then ends the process.

When the count value of scan counter 14 is not the same as the count value of document volume counter 21 (NO in step S8), output determination unit 20 instructs operator panel controller 30 to display scan result check screen 52 shown in FIG. 4. Then, operator panel controller 30 instructs scan result check screen display controller 32 to display scan result check screen 52. Upon this instruction, scan result check screen display controller 32 displays scan result check screen 52 shown in FIG. 4 (step S9). After that, scan result check screen display controller 32 waits for the user to select cancel button 52*b*, OK button 52*c*, or detail check button 52*d* (step S10).

When scan result check screen display controller 32 detects that cancel button 52*b* is pressed in step S10, scan result check screen display controller 32 informs output determination unit 20 of the instruction for cancellation. Upon receiving the cancel instruction, output determination unit 20 clears scan counter 14 (step S17) and deletes the image data stored in image data memory 18 (step S18) and then ends the process.

When scan result check screen display controller 32 detects that OK button 52*c* is pressed in step S10, scan result check screen display controller 32 informs output determination unit 20 of the instruction for transmitting the image data. Upon being informed of this image data transmission instruction, output determination unit 20 obtains the data from image data memory 18 and instructs image output unit 40 to transmit the image data by e-mail (step S16). When determining that all the data stored in image data memory 18 is completely transmitted, output determination unit 20 clears scan counter 14 (step S17), deletes all the image data stored in image data memory 18 (step S18) and then ends the process.

On the other hand, when scan result check screen display controller 32 detects that detail check button 52*d* is pressed in step S10, scan result check screen display controller 32 informs output determination unit 20 of the instruction for displaying the image data. Upon being informed of the image data display instruction, output determination unit 20 informs operator panel controller 30 of primary image ID 22 and instructs operator panel controller 30 to display an edit entry display screen. When being instructed to display the edit entry display screen, operator panel controller 30 instructs edit screen display controller 31 to display edit screen 53 of FIG. 5. Upon receiving this display instruction, edit screen display controller 31 displays edit screen 53 of FIG. 5 (step S11).

After that, edit screen display controller 31 waits for the user to select one of editing condition keys in editing condition button 53*e*, left arrow key 53*c* and right arrow key 53*d* for scrolling, deletion page amount button 53*f* (serving as a deletion page amount display), start button 53*g*, and close button 53*h* (step S12). When close button 53*h* is pressed, edit screen display controller 31 informs output determination unit 20 of discontinuation of editing. Upon being informed of the discontinuation of editing, output determination unit 20 instructs operator panel controller 30 to display scan result check screen 52 of FIG. 4 (step S9), and then proceeds back to step S10.

When start button 53*g* is pressed in step S12, edit screen display controller 31 informs output determination unit 20 of the edit instruction with an editing condition, an edit page number (the number of a page subject to be edited), a deletion page amount (the number of sheets to be deleted), which are input by the user. Upon being informed of the edit instruction, output determination unit 20 determines whether there is an adding request in the editing condition (step S13). When there is an adding request, output determination unit 20 instructs image input unit 10 to execute image-scanning (step S14). After that, upon being informed of a completion of image-scanning by image input unit 10, output determination unit 20 generates an image ID as secondary image ID 23, stores secondary image ID 23 in such a manner that secondary image ID 23 is related to the image data path that is communicated by image input unit 10, and instructs image editor 24 to edit the image data, based on the editing condition received from edit screen display controller 31. When image editor 24 is instructed to edit the image data or when there is no adding request in step S13, image editor 24 edits the image data (step S15), instructs operator panel controller 30 to display scan result check screen 52 of FIG. 4 (step S9), and then proceeds back to step S9.

(Edit Screen Displaying Process (Step S11) in FIG. 6)

Figure 7:
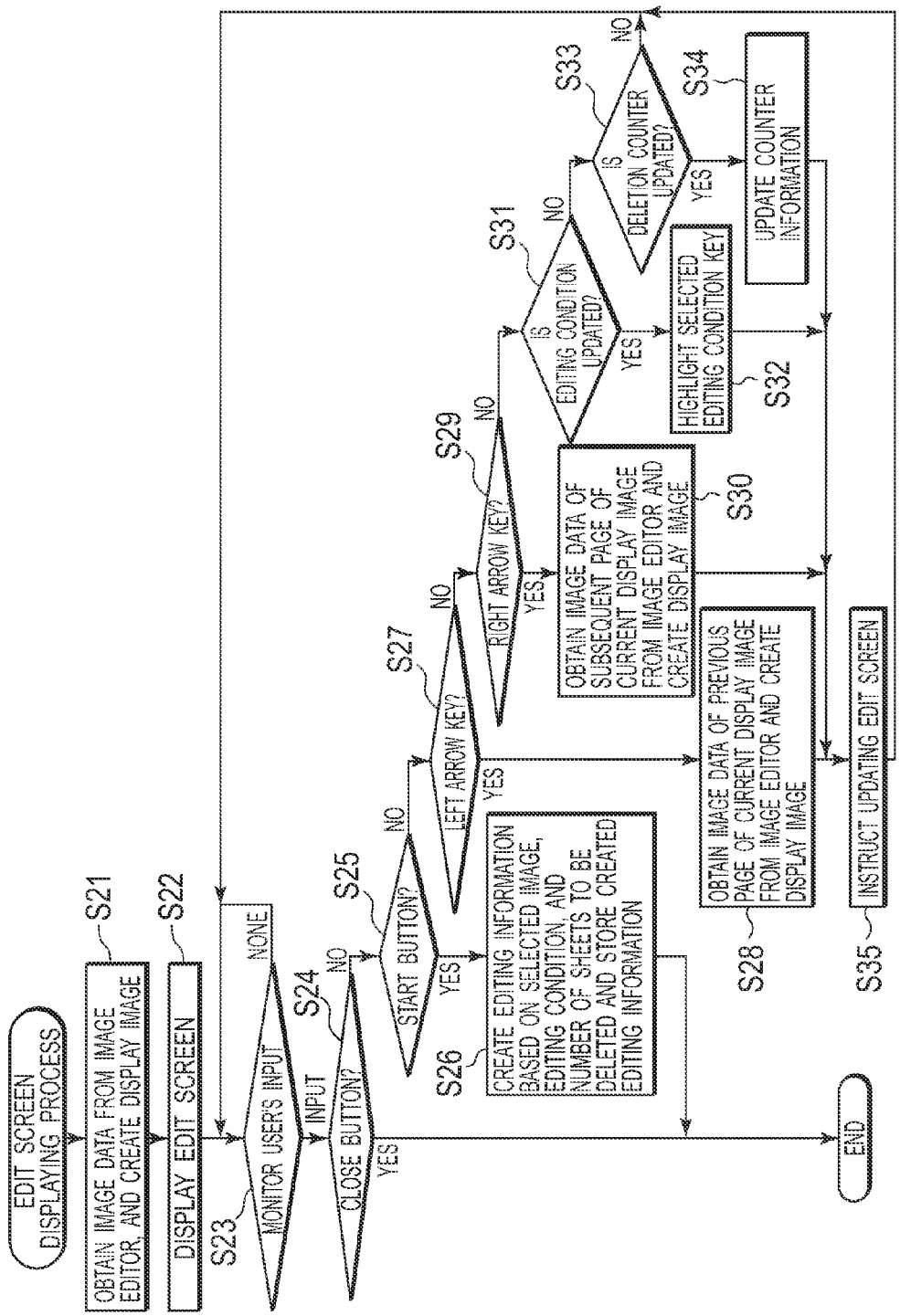
FIG. 7 is a flowchart of an edit screen displaying process (step S11) shown in FIG. 6.

FIG. 7 is a flowchart of the edit screen displaying process (step S11) in FIG. 6.

Upon starting an edit screen displaying process, edit screen display controller 31 requests image editor 24 to obtain an image displayable in image display area 53*b* in edit screen 53 of FIG. 5 (step S21) as specifying a display size, a display resolution, and primary image ID 22 received from output determination unit 20. In other words, edit screen display controller 31 obtains the image data from image editor 24 and creates a display image thereof fit to image display area 53*b*. When image editor 24 obtains the display image, edit screen display controller 31 displays the obtained display image in image display area 53*b* (step S22). After that, edit screen display controller 31 waits for an input of left arrow key 53*c* for scrolling, right arrow key 53*d* for scrolling, editing condition button 53*e*, deletion page amount button 53*f*, start button 53*g*, or close button 53*h* as monitoring the input from the user (step S23).

In step S24, edit screen display controller 31 checks whether the input from the user is close button 53*h* or not. When the input is close button 53*h* (YES in step S24), edit screen display controller 31 informs output determination unit 20 of a discontinuation of editing and then ends the process. When the input from the user is not close button 53*h* (NO in step S24), edit screen display controller 31 checks whether the input is start button 53*g* or not (step S25). When the input is start button 53*g* (YES in step S25), edit screen display controller 31 creates editing information based on the image, the selected editing condition, and the selected deletion page amount (the number of sheets to be deleted), stores the created editing information, and informs output determination unit 20 of an editing request with the selected editing condition, the selected edit page number, and the selected deletion page amount (step S26). Then, edit screen display controller 31 ends the process.

When the input from the user is not start button 53*g* (NO in step S25), edit screen display controller 31 checks whether the input from the user is left arrow key 53*c* or not (step S27).

When the input is left arrow key 53*c* (YES in step S27), edit screen display controller 31 requests, from image editor 24, image data of the previous page of the current display image currently shown in image display area 53*b* in edit screen 53 (step S28) and shifts the current display image rightward by one page and inserts the obtained page image into the left end of image display area 53*b* of edit screen 53, so as to update the display image accordingly (step S35). Then, edit screen display controller 31 proceeds back to the user input monitoring process (step S23).

When the input from the user is not left arrow key 53*c* (NO in step S27), edit screen display controller 31 checks whether the input from the user is right arrow key 53*d* or not (step S29). When the input is right arrow key 53*d* (YES in step S27), edit screen display controller 31 requests image data of the subsequent page of the current display image currently shown in image display area 53*b* in edit screen 53 from image editor 24 (step S30) and shifts the current display image leftward by one page and inserts the page image of the obtained image data into the right end of image display area 53*b* of edit screen 53, so as to update the display image accordingly (step S35). Then, edit screen display controller 31 proceeds back to the user input monitoring process (step S23).

When the input from the user is not right arrow key 53*d* (NO in step S29), edit screen display controller 31 checks whether the input from the user is any editing condition keys in editing condition button 53*e* or not (step S31). When the input is one of the editing condition keys (YES in step S31), edit screen display controller 31 highlights (lightens) the selected editing condition key (step S32) so as to update the display image accordingly (step S35), and then proceeds back to the user input monitoring process (step S23).

When the input from the user is not any editing condition key (NO in step S31), edit screen display controller 31 checks whether the input from the user is a delete key in the editing condition button 53*e* (editing condition button) or not (step S33). When the input is the delete key (YES in step S33), edit screen display controller 31 updates counter information (delete counter) of deletion page amount button 53*f* (step S34), updates the display accordingly (step S34), and then proceeds back to the user input monitoring process (step S23).

(Image Data Editing Process (Step S15) in FIG. 6)

Figure 8:
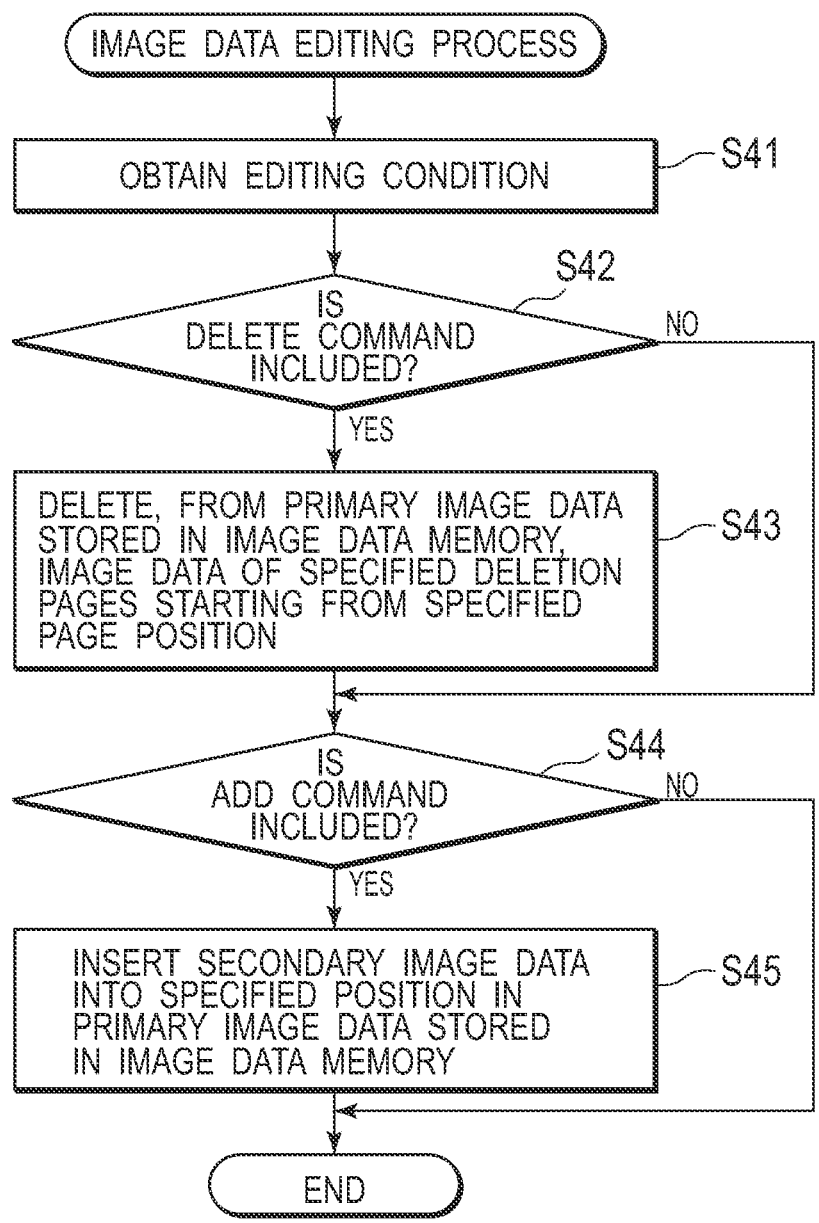
FIG. 8 is a flowchart of an image data editing process (step S15) shown in FIG. 6.

FIG. 8 is a flowchart of the image data editing process (step S15) in FIG. 6.

In the image data editing process (step S15), image editor 24 first obtains the editing condition, the edit page number (the page number of a page subject to be edited), and the deletion page amount (the number of sheets to be deleted), that are communicated by edit screen display controller 31 (step S41). Image editor 24 checks whether the editing condition that is communicated by edit screen display controller 31 includes a delete command (step S42). When the editing condition includes a delete command (YES in step S42), image editor 24 deletes, from the primary image data stored in image data memory 18, image data of pages of the deletion page amount starting from the position of the edit page number, based on the edit page number (the number of a page subject to be edited) and the deletion number (the number of sheets subject to be deleted) (step S43), and then proceeds to step S44. On the other hand, when the editing condition does not include a delete command (NO in step S42), image editor 24 proceeds to step S44.

In step S44, image editor 24 checks whether the editing condition from edit screen display controller 31 is an add command or not (step S44). When an add command exists (YES in step S42), image editor 24 specifies, based on the edit page number, secondary image data (re-scanned image data), also specifies, based on primary image ID 22, the primary image data, edits the primary image data using the secondary image data, and then ends the process. That is, image editor 24 inserts the secondary image data (image data of the re-scanned document sheet(s)) into the position of the specified edit page number in the primary image data stored in image data memory 18 (step S45), and then ends the process. On the other hand, in step S44, when there is no add command (NO in step S44), the process ends directly.

Effect of First Embodiment

According to the first embodiment, when the number of the scanned document sheets is less than the number of the original document sheets that is input by the user by using the user document volume input screen 51 of FIG. 3 (which is, the number of document sheets that the user intends to have the apparatus scan), the apparatus has the user check scan result check screen 52, set an unscanned document sheet(s) to re-scan it, edits the rescanned image data with edit screen 53 of FIG. 5 (for example, adding the rescanned image data into an appropriate position), and outputs the edited image data. Therefore, when an overlapped feed occurs while scanning the document sheets, the user can identify the unscanned sheet(s) of the document where the overlapped feed occurred in order to re-scan the unscanned sheet(s) before sending an e-mail. This shortens the time for scanning the document.

Second Embodiment

Configuration of Second Embodiment

Figure 9:
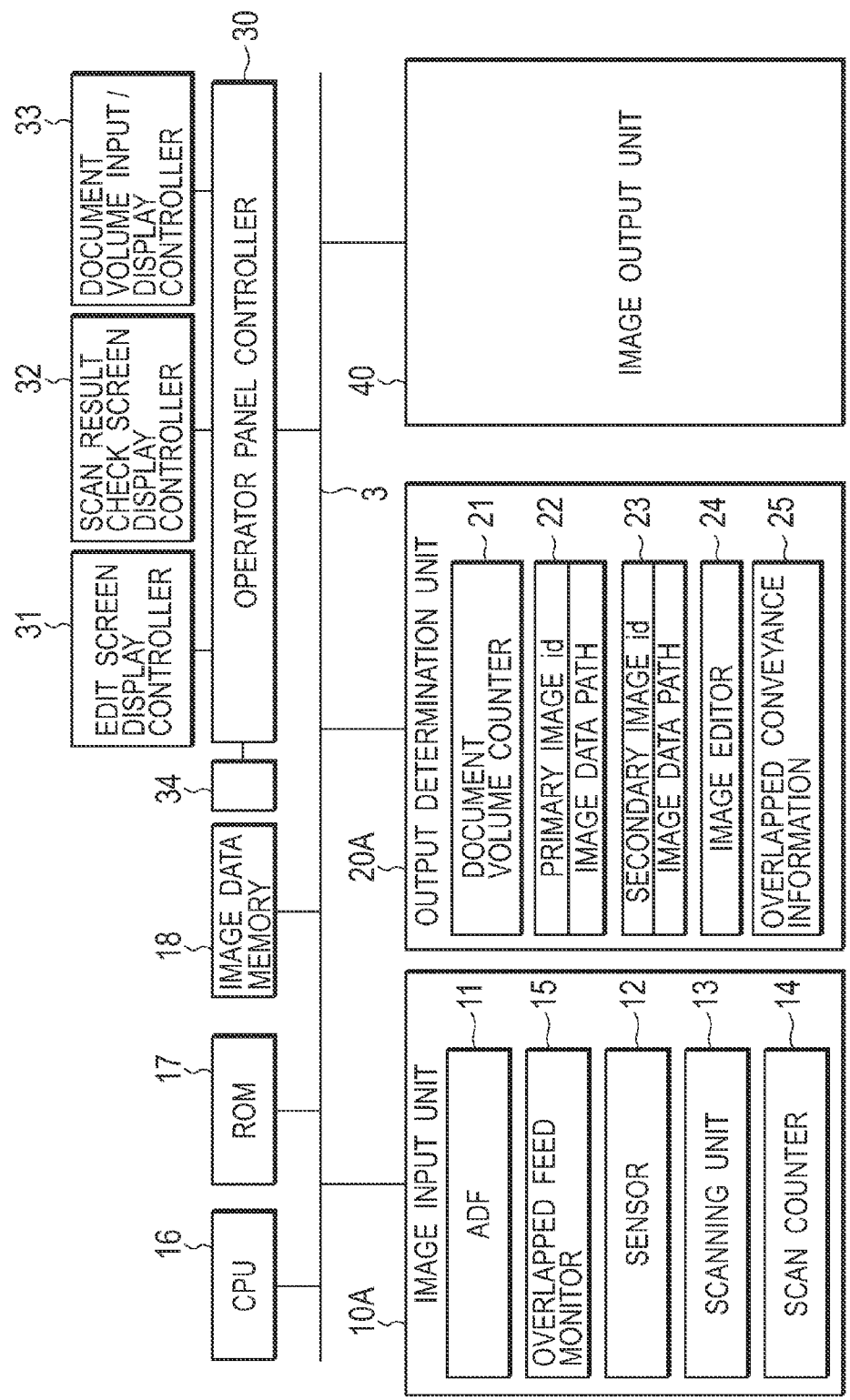
FIG. 9 is a configuration diagram of image scanning apparatus 1A of a second embodiment of the invention.

FIG. 9 is a configuration diagram of image scanning apparatus 1A of the second embodiment according to the invention. In FIG. 9, the same constitutions as in FIG. 2 of the first embodiment are donated by the same reference numerals as in FIG. 2.

As a substitute for image scanning apparatus 1 of the first embodiment, image scanning apparatus 1A of the second embodiment is used in the image processing system of the first embodiment show in FIG. 1. Image scanning apparatus 1A of the second embodiment includes: image input unit 10A which has a configuration different from the first embodiment; CPU 16; ROM 17; image data memory 18; output determination unit 20A which has a configuration different from the first embodiment; operator panel controller 30; edit screen display controller 31; scan result check screen display controller 32; document volume input/display controller 33; operator panel 34; and image output unit 40. Note that CPU 16, ROM 17, image data memory 18, operator panel controller 30, edit screen display controller 31, scan result check screen display controller 32, document volume input/display controller 33, operator panel 34, and image output unit 40 are the same as those of the first embodiment.

Image input unit 10A of the second embodiment has an overlapped feed detector (for example, overlapped feed monitor 15) in addition to the components of image input unit 10 of the first embodiment. Overlapped feed monitor 15 is configured to detect (monitor) an occurrence of an overlapped feed wherein two or more document sheets 2 are fed while being overlapped each other. Output determination unit 20A of the second embodiment has overlapped-feed information 25 in addition to the components of output determination unit 20 of the first embodiment. The other configurations are the same as those of the first embodiment.

Figure 10:
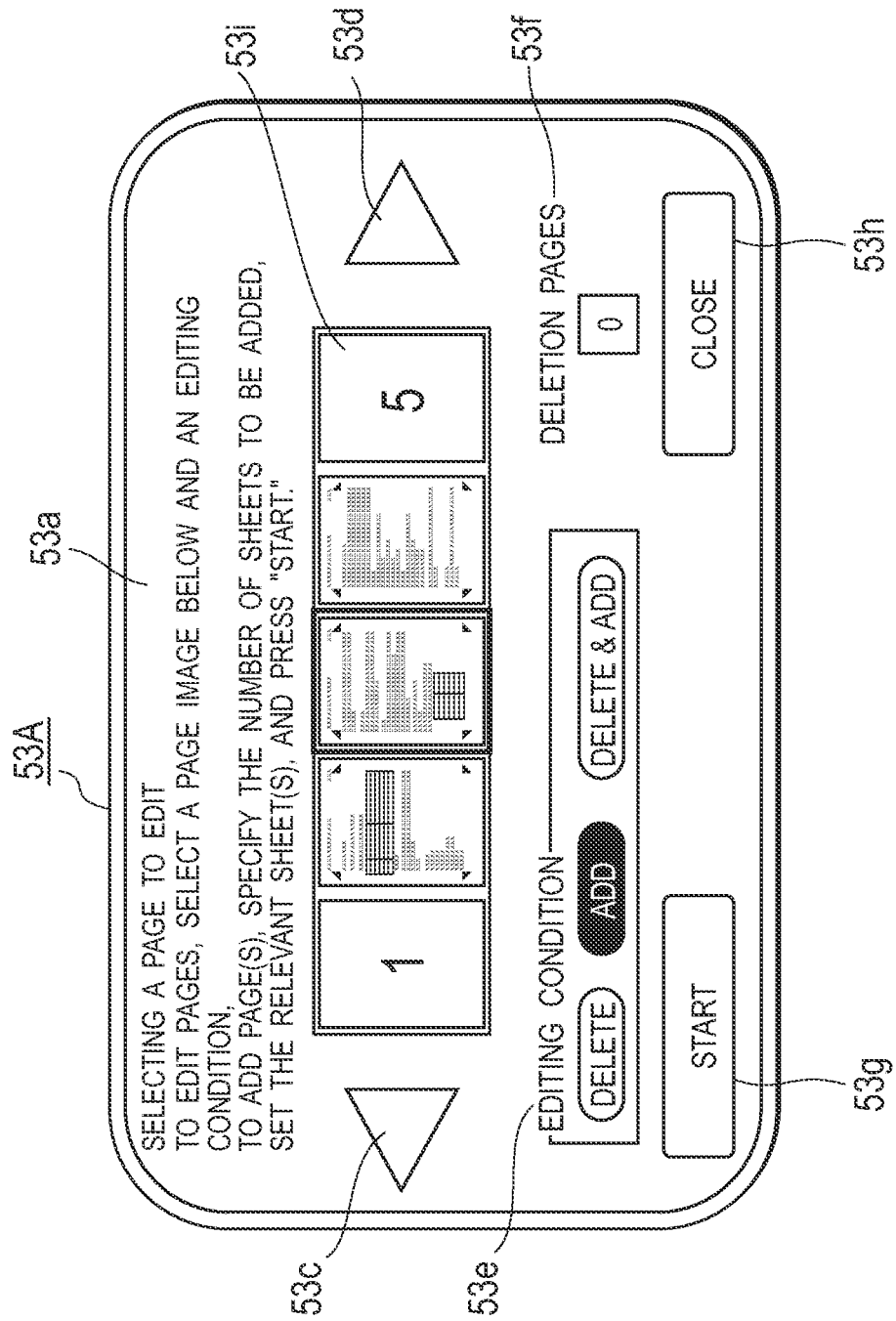
FIG. 10 is a view of a display example of an edit screen of image scanning apparatus 1A of FIG. 9.

FIG. 10 is a view of a display example of the edit screen of image scanning apparatus 1A of FIG. 9. In FIG. 10, the same constituents as in FIG. 5 are designated by the same reference numerals as in FIG. 5.

Edit screen 53A of the second embodiment has image display area 53*i*, as a substitute for image display area 53*b* in edit screen 53 of the first embodiment. Image display area 53*i* has a function as a display unit to highlight the page where an occurrence of an overlapped feed was detected, in addition to the same functions as those of image display area 53 of the first embodiment. The other configurations are the same as those of the first embodiment.

Scan-to-Email Process in Second Embodiment

Figure 11:
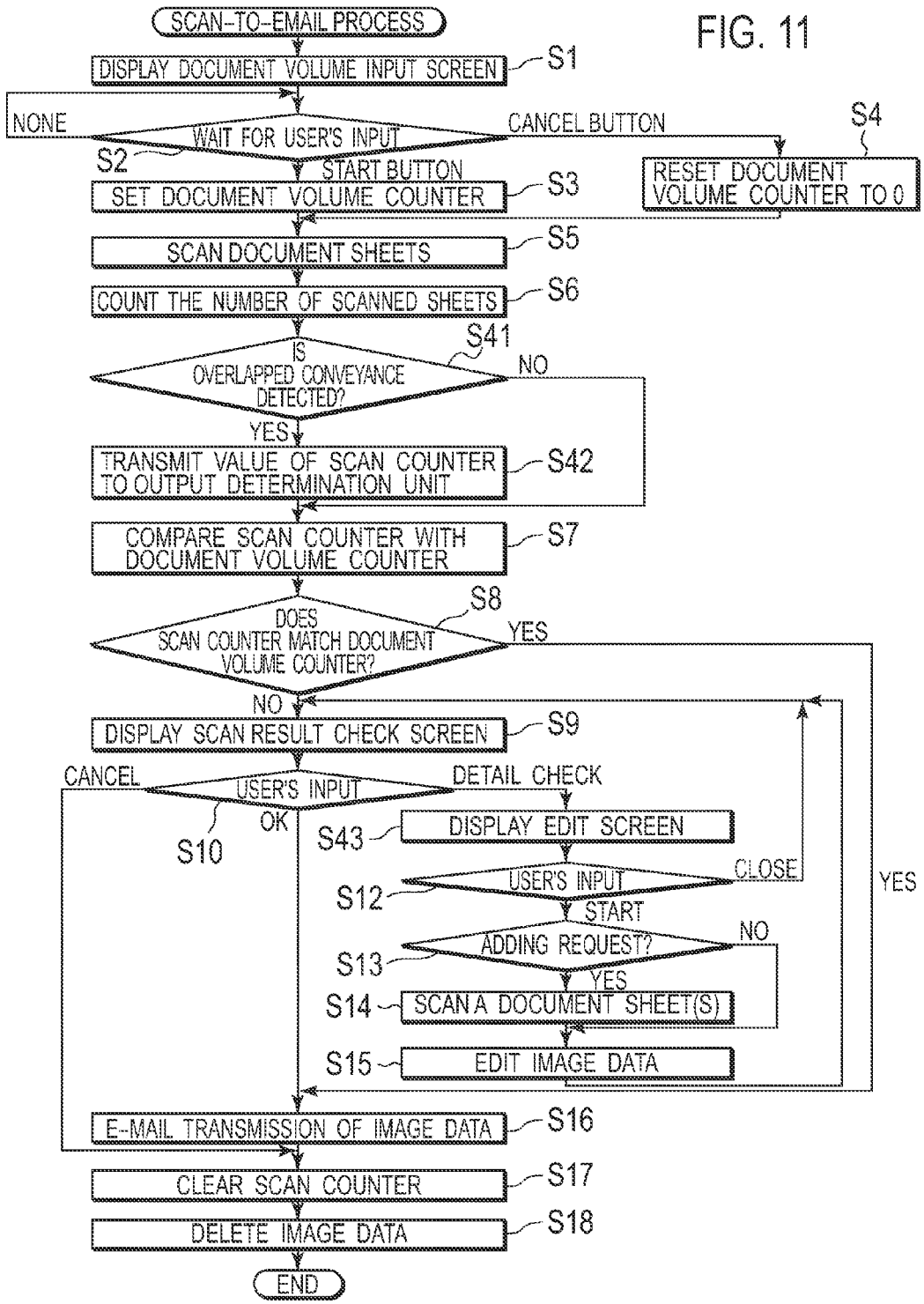
FIG. 11 is an outline flowchart of the scanning process (scan-to-email process) of image scanning apparatus 1A of FIG. 9.

FIG. 11 is an outline flowchart of the scanning process (scan-to-email process) of image scanning apparatus 1A of FIG. 9. In FIG. 11, the same constituents as in FIG. 6 of the first embodiment are designated by the same reference numerals as in FIG. 6.

The flowchart of FIG. 11 uses overlapped feed monitor 15 (steps S41,S42) between the counting process (step S6) to count the number of the scanned sheets and the comparison process (step S7) to compare scan counter 14 with document volume counter 21 in the flowchart of FIG. 6. Also, the flowchart of FIG. 11 has, instead of the edit screen displaying process (step S11) of FIG. 6, the edit screen displaying process (step S43). The processes that are different from the first embodiment will be explained below since the other processes are the same as those of the first embodiment.

In the scan-to-email process, after the counting process (step S6) to count the number of the scanned sheets, step S41 is executed in which overlapped feed monitor 15 monitors on-time duration, which is the time period in which sensor 12 is kept on to detects whether or not an overlapped feed occurs (that is, checks whether or not the on-time duration is longer than a time period corresponding to the size of the scanned document sheets by a predetermined ratio (for example, 5%) of the size). When it is determined that the on-time duration is longer than the time period corresponding to the scanned document sheet size by 5% of the time period corresponding to the size (YES in step S41), overlapped conveyance monitor 15 transmits the value of scan counter 14 as overlapped-feed information 25 to output determination unit 20A (step S42), and proceeds to step S7 to compare the value of scan counter 14 with the value of document volume counter 21. On the other hand, when it is determined that the on-time duration is not longer than the time period corresponding to the scanned document sheet size by 5% of the time period corresponding to the size (No in step S41), the process proceeds to step S7.

Then, Steps S7 to S10 that are the same as the first embodiment are executed. In step S10, when it is detected that detail check button 52*d* of FIG. 4 is pressed, scan result check screen display controller 32 informs output determination unit 20A of the image data display instruction (an instruction for displaying the image data). Upon being informed of this image data display instruction, output determination unit 20A informs operator panel controller 30 of primary image ID 22 and instructs operator panel controller 30 to display an edit entry display screen. When being instructed to display the edit entry display screen, operator panel controller 30 instructs edit screen display controller 31 to display edit screen 53A of FIG. 10. Upon this display instruction, edit screen display controller 31 displays edit screen 53A of FIG. 10 (step S43). After that, the same processes as in the first embodiment are executed.

Edit Screen Displaying Process (Step S43) in Second Embodiment

Figure 12:
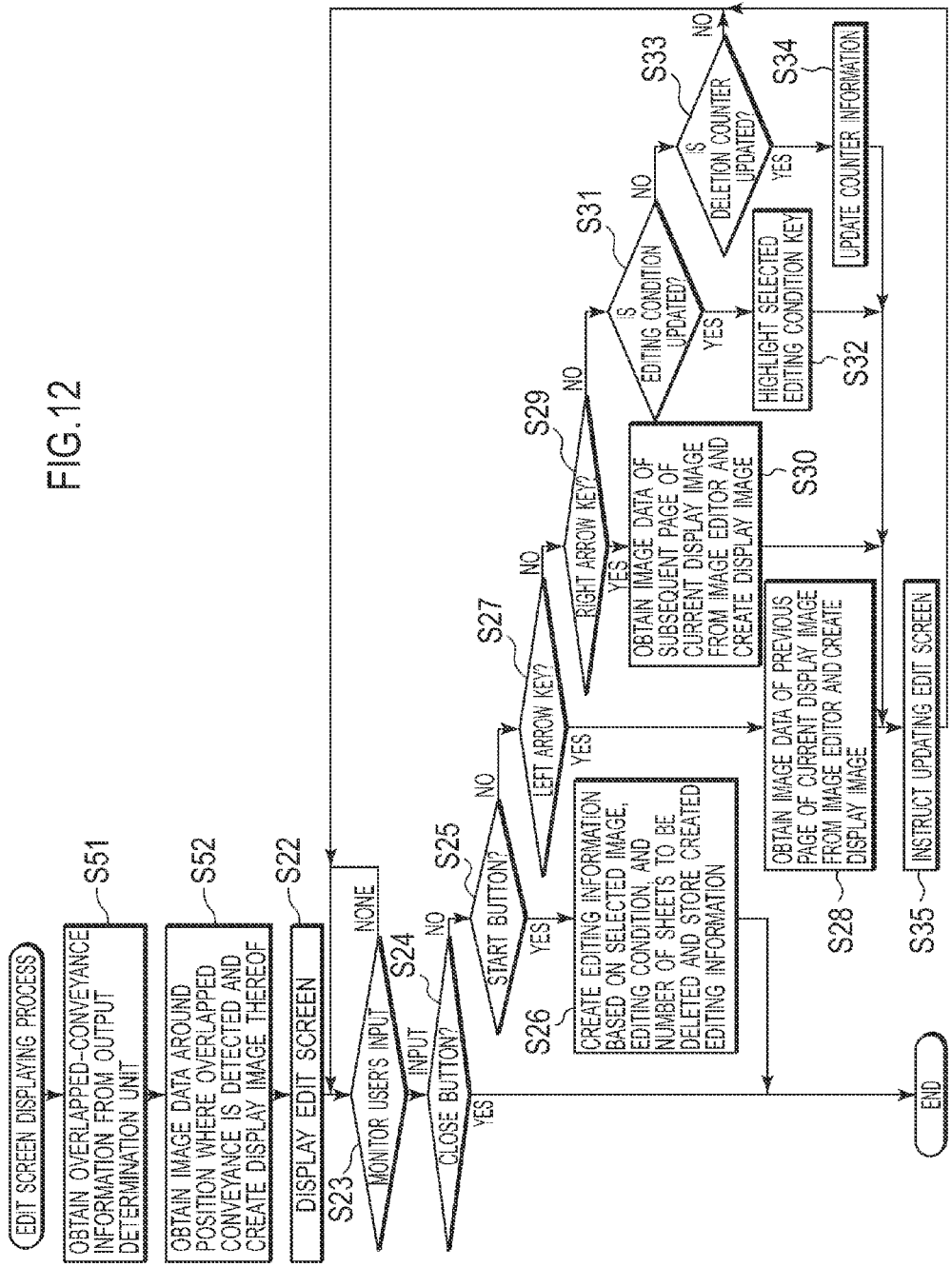
FIG. 12 is a flowchart of an edit screen displaying process (step S43) shown in FIG. 11.

FIG. 12 is a flowchart of the edit screen displaying process (step S43) shown in FIG. 11. In FIG. 12, the same constituents as in FIG. 7 of the first embodiment are designated by the same reference numerals as in FIG. 7.

The flowchart of FIG. 12 has steps S51 and S52 instead of step S21 of the flowchart of FIG. 7. The processes that are different from the first embodiment will be explained below since the other processes are the same as those of the first embodiment.

Upon starting the edit screen displaying process, edit screen display controller 31 obtains overlapped-feed information 25 that is communicated by overlapped feed monitor 15 from output determination unit 20A (step S51), and proceeds to step S52. In step S52, edit screen display controller 31 instructs, based on overlapped-feed information 25, image editor 24 to obtain and display the image of the previous and subsequent sheets of the overlapped document sheets in such a manner that an image of the document sheets that is determined to be an overlapped document sheet is highlighted, as shown in image display area 53*i* of edit screen 53A shown in FIG. 10. That is, edit screen display controller 31 obtains, from image editor 24, the image data of a previous page and of a subsequent page where the overlapped feed occurred, and generates a display image thereof. After that, the processes of steps S22 to S35 are executed in the substantially same way as in the first embodiment.

Effect of Second Embodiment

According to the second embodiment, the portion where an overlapped feed occurred is specified by overlapped feed monitor 15 and is displayed highlighted in image display area 53*i* in edit screen 53A. Thus, the second embodiment reduces the time that the user spends to look for the portion where the overlapped conveyance occurs, as compared with the first embodiment.

Third Embodiment

Configuration of Third Embodiment

Figure 13:
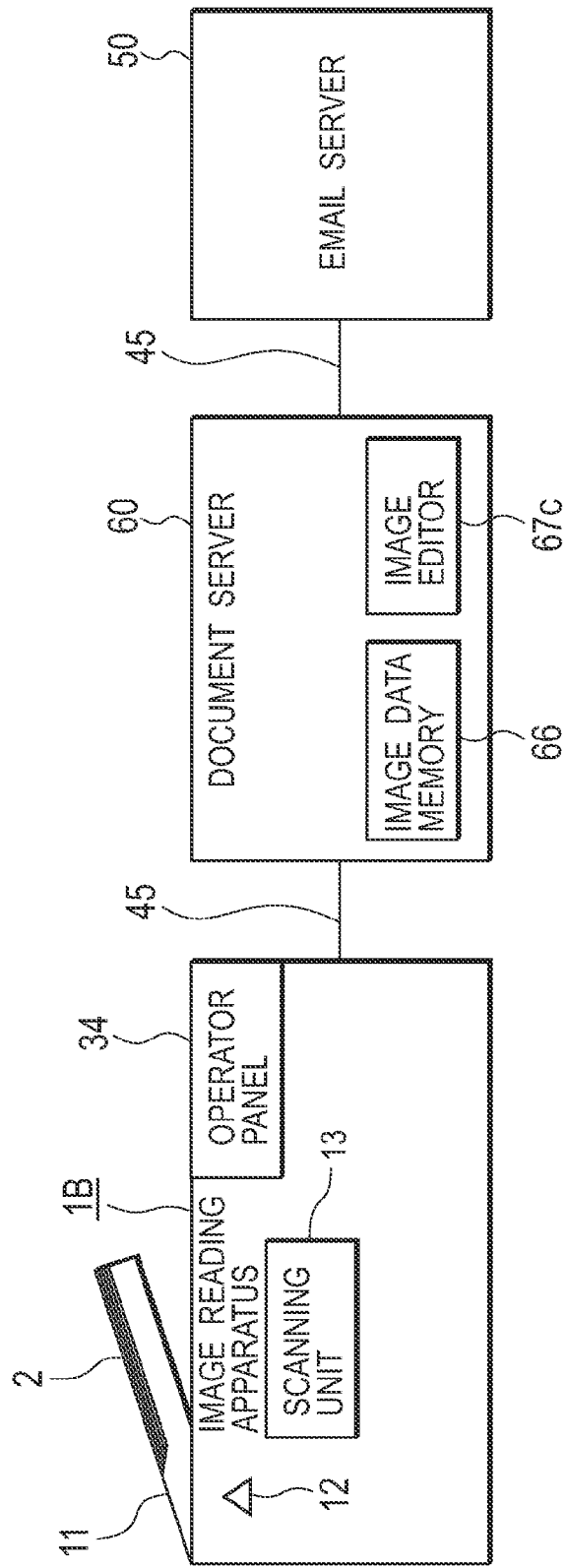
FIG. 13 is a configuration diagram illustrating an outline of an image processing system of a third embodiment of the invention.

FIG. 13 is a configuration diagram illustrating an outline of an image processing system of a third embodiment of the invention. In FIG. 13, the same constituents as in FIG. 1 of the first embodiment are designated by the same reference numerals.

The image processing system of the third embodiment includes: image scanning apparatus 1B that has a configuration different from image scanning apparatus 1 of the first embodiment; an image processor (for example, document server 60) connected to image scanning apparatus 1B via network cable 45; and email server 50, which has the same configuration as that of the first embodiment, connected to document server 60 via network cable 46.

Image scanning apparatus 1B of the third embodiment has a different configuration from image scanning apparatus 1 of the first embodiment in such a manner that image scanning apparatus 1B does not have image data memory 18 and image editor 24, which are provided in image scanning apparatus 1 of the first embodiment.

Document server 60 includes a memory (for example, image data memory 66) configured to store therein image data scanned by image scanning apparatus 1B, an editor (for example, image editor 67c) configured to edit the image data stored in image data memory 66, and the like.

Figure 14:
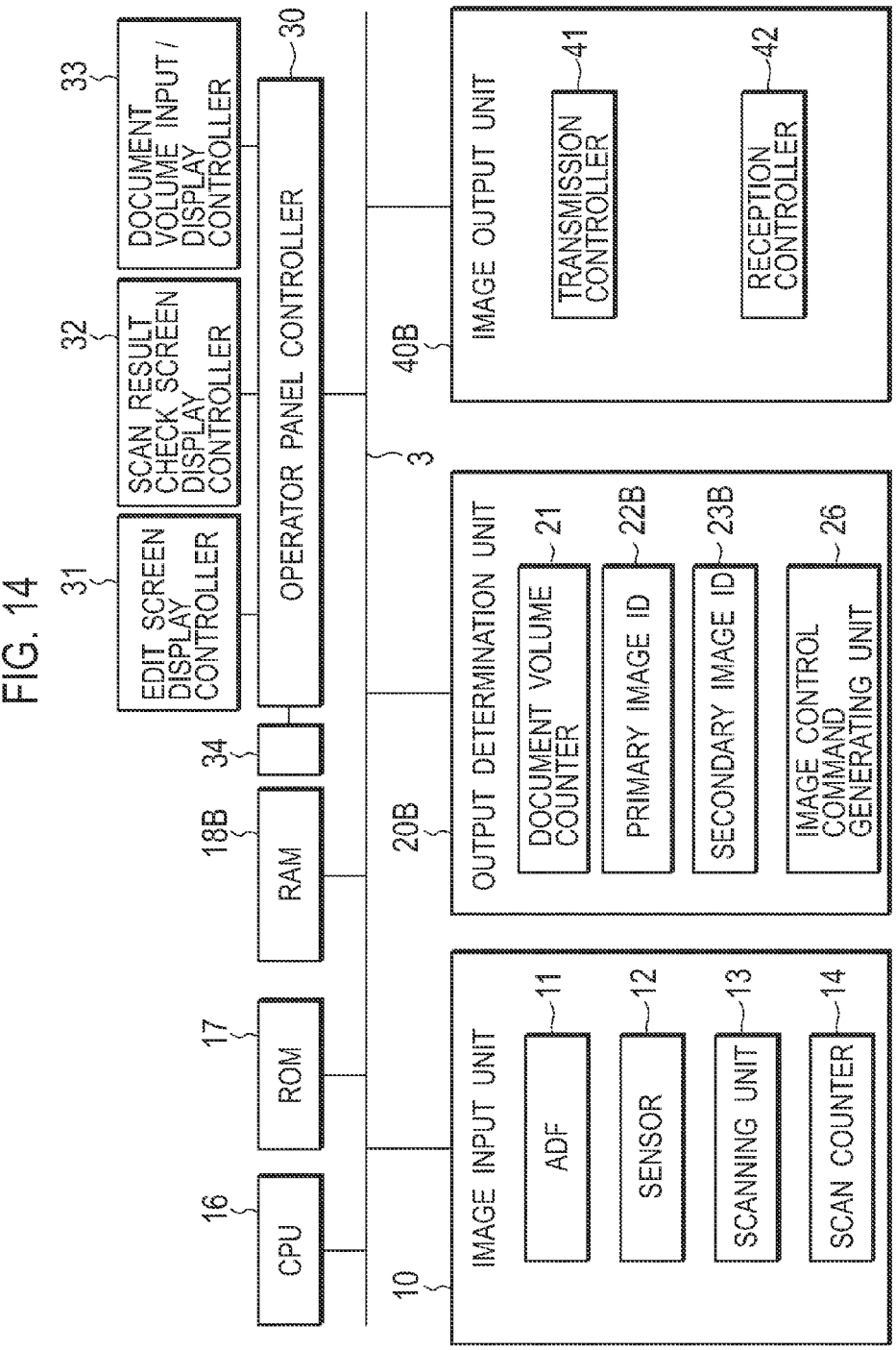
FIG. 14 is a configuration diagram of image scanning apparatus 1B shown in FIG. 13.

FIG. 14 is a configuration diagram of image scanning apparatus 12 shown in FIG. 13. In FIG. 14, the same constituents as in the first embodiment are designated by the same reference numerals as in FIG. 2 of the first embodiment.

Image scanning apparatus 1B of the third embodiment includes: image input unit 10 configured to control scanning of document 2; CPU 16 and ROM 17 which are the same as the first embodiment; Random Access Memory 188 (hereinafter "RAM") which is different from image data memory 18 of the first embodiment; output determination unit 208 which has a different configuration from output determination unit 20 of the first embodiment; operator panel controller 30 configured to control operator panel 34; edit screen display controller 31; scan result check screen display controller 32; document volume input/display controller 33 configured to control various types of operator panel 34 to display and to monitor input from the user; operator panel 34; an image data transfer unit (for example, image transmission reception unit 40B) has a different configuration from image output unit 40 of the first embodiment, wherein those components are connected to each other via internal bus 3 which is the same as that of the first embodiment. Note that image input unit 10, operator panel controller 30, edit screen display controller 31, scan result check screen display controller 32, and document volume input/display controller 33 operate in the same way as those of the first embodiment.

Output determination unit 20B has a function as a detector configured to determine whether or not to output image data primarily scanned by image input unit 10 to email server 50, that is, configured to determine whether a feeding failure of document sheets 2 occurred or not. Output determination unit 20B has document volume counter 21 which is the same as the first embodiment, primary image ID 22B and secondary image ID 23B which are managed in the same way as or similar to the first embodiment, and image control command generating unit 26 which does not exist in the first embodiment.

Document volume counter 21 is a counter configured to hold the number of document sheets the user intends to have the apparatus scan, which was communicated by document volume input/display controller 33. Output determination unit 20B has image IDs to specify the places where image data (primary image data, secondary image data) that are created by image input unit 10 are stored in image data memory 66 in the document server 60. Primary image data, which are primarily scanned to be sent out to email server 50, is managed with primary image ID 22B, and secondary image data, which are re-scanned (secondarily scanned) and temporarily stored, is managed with secondary image ID 23B. Image control command generating unit 26 is configured to issue a command to image editor 67c in document server 60, based on an editing instruction from edit screen display controller 31. Image control command generating unit 26 also has a function as an informer to inform document server 60 of editing information.

Image transmission reception unit 40B is configured to execute transmission and reception of commands and/or image data and includes transmission controller 41 to output the commands and/or the image data to document server 60, reception controller 42 to obtain the image data from document server 60, and the like.

Figure 15:
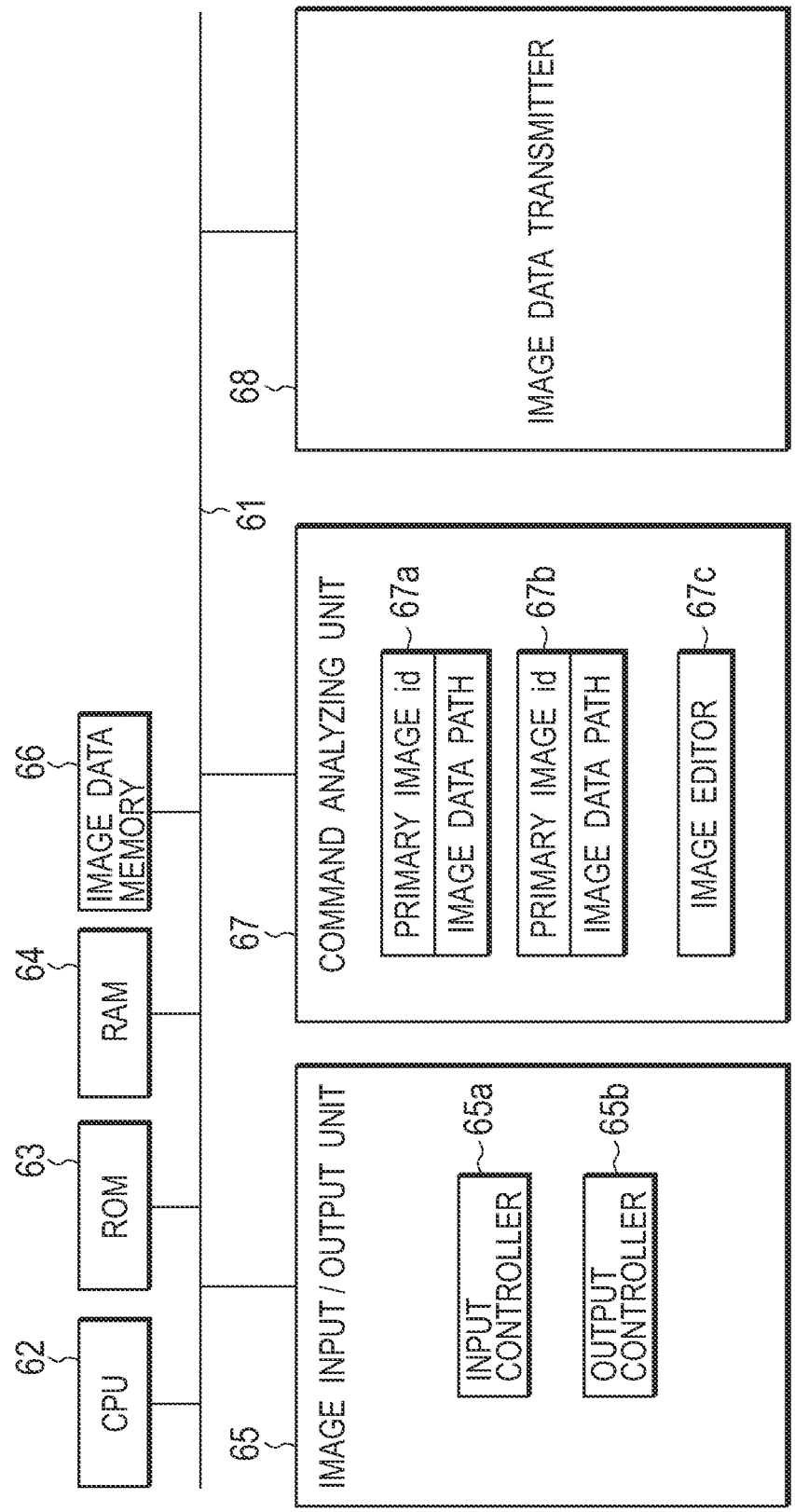
FIG. 15 is a configuration diagram of document server 60 shown in FIG. 13.

FIG. 15 is a configuration diagram of document server 60 shown in FIG. 13.

Document server 60 includes therein internal bus 61. Connected to internal bus 61 are: CPU 62 configured to control the overall of document server 60 according to programs, ROM 63 storing therein the programs, RAM 64 configured to store therein working data, image input/output unit 65 configured to transmit and receive commands and image data to and from image scanning apparatus 1B, image data memory 66 configured to store therein the image data received from image scanning apparatus 13, command analyzing unit 67 configured to analysis the command received from image scanning apparatus 1B, and an output unit (for example, image data transmitter 68) configured to transmit data of image data memory 66 to email server 50.

Image input/output unit 65 includes input controller 65a configured to receive commands and image data from image scanning apparatus 13, a reply unit (for example, output controller 65b) configured to transmit the image data to image scanning apparatus 1B, and the like.

Command analyzing unit 67 includes: plural image data management information comprising primary image IDs 67a and 67b and image data paths (directories) to manage the relationship between image IDs transmitted from image scanning apparatus 13 and image data stored in image data memory 66; image editor 67c configured to edit, based on an image edit instruction received from image scanning apparatus 13, the image data stored in image data memory 66; and the like.

Scan-to-Email Process of Third Embodiment

Figure 16:
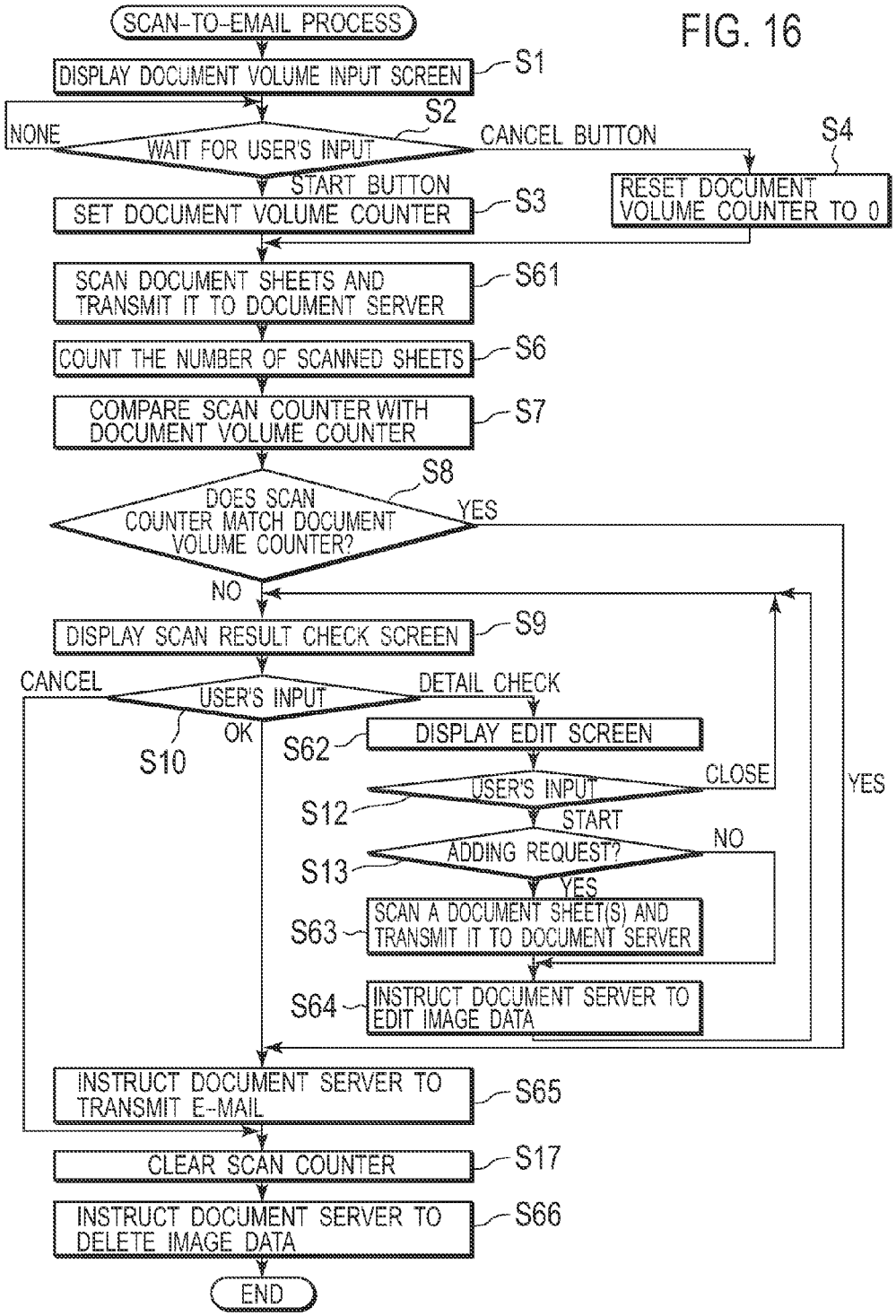
FIG. 16 is an outline flowchart of the scanning process (scan-to-email process) of the image processing system shown in FIGS. 13 and 14.

FIG. 16 is an outline flowchart of the scanning process (scan-to-email process) of the image processing system shown in FIGS. 13 and 14. In FIG. 16, the same constituents as in the first embodiment are designated by the same reference numerals as in FIG. 6 of the first embodiment.

In the flowchart of FIG. 16 of the third embodiment, the processes of steps S61 to S66 are different from those in the flowchart of FIG. 6 of the first embodiment.

When the user uses operator panel 34 to execute a scan-to-email process, image scanning apparatus 1B shown in FIGS. 13 and 14 executes steps S1 to S4 that are the same as in the first embodiment and then proceeds to step S61.

In step S61, output determination unit 20B creates image ID information as primary image ID 22B for treating primary image data and stores primary image ID 22B, and then instructs image input unit 10 to scan document sheets 2. Upon being instructed to scan document sheets 2, image input unit 10 controls ADF 11, sensor 12, and scanning unit 13 so as to scan document sheets 2. Output determination unit 20B generates an image data transmission command by attaching primary image ID 22B to the image data of scanned document sheets 2 and then image transmission reception unit 40B transmits the image data transmission command to document server 60.

After the transmission, the processes of steps S6 to S10 are executed in substantially the same way as in the first embodiment, and then proceeds to step S62.

In step S62, similar to the first embodiment, when detecting that detail check button 52d of FIG. 4 is pressed in step S10, scan result check screen display controller 32 informs output determination unit 20B that an image data display request is instructed. Upon receiving the instruction of the image data display request, output determination unit 20B informs operator panel controller 30 of primary image ID 22B and instructs operator panel controller 30 to display an edit screen. When being instructed to display the edit screen, operator panel controller 30 instructs edit screen display controller 31 to display edit screen 53 of FIG. 5. When being instructed to display edit screen 53, edit screen display controller 31 displays edit screen 53 of FIG. 5 and then proceeds to step S12.

Step S12 waits for an input from the user on edit screen 53 of FIG. 5 (that is, waits for pressing of start button 53g or close button 53h), and then proceeds to step S13 when start button 53g is pressed. In step S13, output determination unit 20B, which receives the edit request, determines whether or not the editing condition includes an add command in the same way or similar way to the first embodiment. When there is an add command in the editing condition, the process proceeds to step S63 and, on the other hand, when there is not an add command, the process proceeds to step S64.

In step S63, output determination unit 20B creates image ID information as secondary image ID 238 for secondary image data (re-scanned image data), holds secondary image ID 23B, and then instructs image input unit 10 to scan (re-scan) an unscanned document sheet(s) 2. When being instructed to scan (re-scan) an unscanned document sheet(s) 2, image input unit 10 controls ADF 11, sensor 12, and scanning unit 13 so as to scan (re-scan) the unscanned document sheet(s) 2. Then, output determination unit 20B creates an image data transmission command by attaching secondary image ID 23B to the image data of the re-scanned document sheet(s), and image transmission reception unit 40B transmits the image data transmission command to document server 60. Then, the process proceeds to step S64.

In step S64, output determination unit 20B transmits an image data edit command including the editing condition, primary image ID 22B, and secondary image ID 23B, which are obtained from edit screen display controller 31, to document server 60 via image transmission reception unit 40B. After the transmission, the process proceeds back to steps S9 and S10 in the same way as the first embodiment. Step S10 waits for an input from the user with scan result check screen 52 of FIG. 4 (that is, waits for pressing of cancel button 52b or OK button 52c of FIG. 4). When OK button 52c is pressed, the process proceeds to step S65 and, on the other hand, when cancel button 52b is pressed, the process proceeds to step S17.

In step S65, output determination unit 20B transmits a mail transmission command addressed to email server 50 to document server 60 via image transmission reception unit 40B, and then proceeds to step S17. In step S17, output determination unit 20B clears scan counter 14 in the same way as or similar to the first embodiment and then proceeds to step S66.

In step S66, output determination unit 20B transmits an image data delete command including primary image ID 22B and secondary image ID 23B to document server 60 via image transmission reception unit 40B and then ends the process.

(Edit Screen Displaying Process (Step S62) in FIG. 16)

Figure 17:
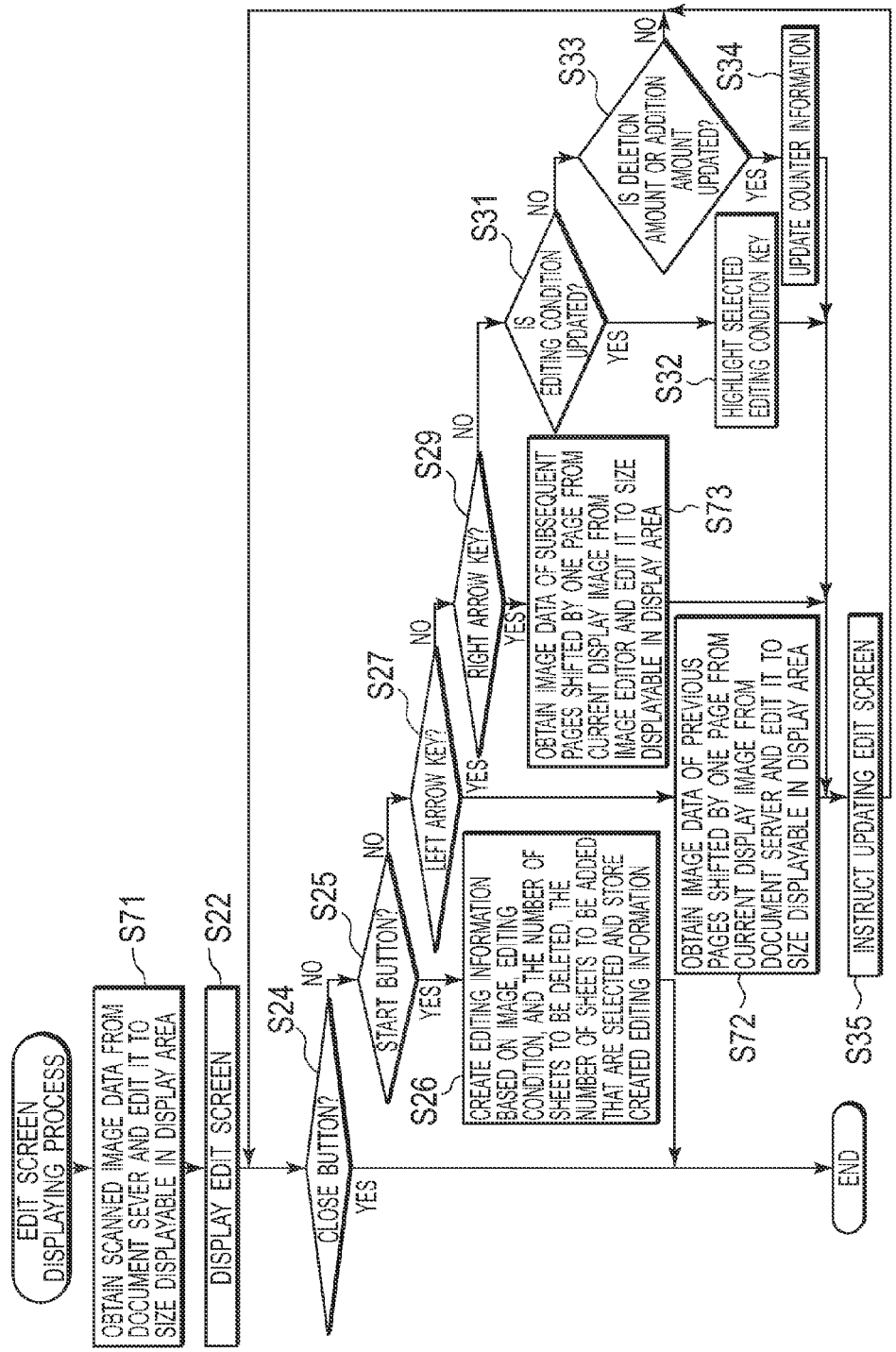
FIG. 17 is a flowchart of an edit screen displaying process (step S62) shown in FIG. 16.

FIG. 17 is a flowchart of an edit screen displaying process (step S62) shown in FIG. 16. In FIG. 17, the same constituents as in the first embodiment are designated by the same reference numerals as in FIG. 7 of the first embodiment.

The flowchart of FIG. 17 of the third embodiment has processes of steps S71 to S73 which are different from the flowchart in FIG. 7 of the first embodiment.

Upon starting the edit screen displaying process, edit screen display controller 31 proceeds to step S71. In step S71, edit screen display controller 31 requests image control command generating unit 26 to obtain a display image displayable in image display area 53b of edit screen 53 of FIG. 5 as specifying the display size, the display resolution, and primary image ID 22 received from output determination unit 20. When being requested to obtain the display image, image control command generating unit 26 transmits the image data transmission command to document server 60 via image transmission reception unit 40B, obtains corresponding image data from document server 60, creates a display image by processing the corresponding image data, and transmits the display image to edit screen display controller 31. In other words, step S71 obtains the scanned image data from document server 60, processes the scanned image data to the size displayable in image display area 53b of edit screen 53 of FIG. 5, and then proceeds to step S22.

Like the first embodiment, in step S22, edit screen display controller 31 displays, in image display area 53b, the display image that is obtained by image control command generating unit 26. After that, step S24 to S27, which are the same as in the first embodiment, are processed. In step S27, when left arrow key 53c is pressed in edit screen 53 of FIG. 5 (YES in step S27), the process proceeds to step S72 and, on the other hand, when left arrow key 53c is not pressed (NO in step S27), the process proceeds to step S29.

In step S72, like step S71, edit screen display controller 31 obtains, from document server 60 via image control command generating unit 26, image data of the previous page of the display image currently displayed in image display area 53b in edit screen 53 of FIG. 5 and then proceeds to step S35. That is, step S73 obtains the image data of the previous page of the display image currently displayed in image display area 53b, processes the image data of the previous page to the size displayable in image display area 53b, and then proceeds to step S35.

Step S35 instructs update of the display image in image display area 53b in edit screen 53 of FIG. 5 in the substantially same way as in the first embodiment and then proceeds back to step S24. In step S29, when right arrow key 53d is pressed in edit screen 53 of FIG. 5 (YES in step S29), the process proceeds to step S73 and, on the other hand, when right arrow key 53d is not pressed (NO in step S29), the process proceeds to step S31.

In step S73, like step S71, edit screen display controller 31 obtains, from document server 60 via image control command generating unit 26, image data of the subsequent page of the display image currently displayed in image display area 53b and processes it to the size displayable in image display area 53b. Then the process proceeds to step S35.

After step S29, the processes from step S31 to S35 are executed in the substantially same way as in the first embodiment.

(Command Analyzing Process of Document Server)

Figure 18:
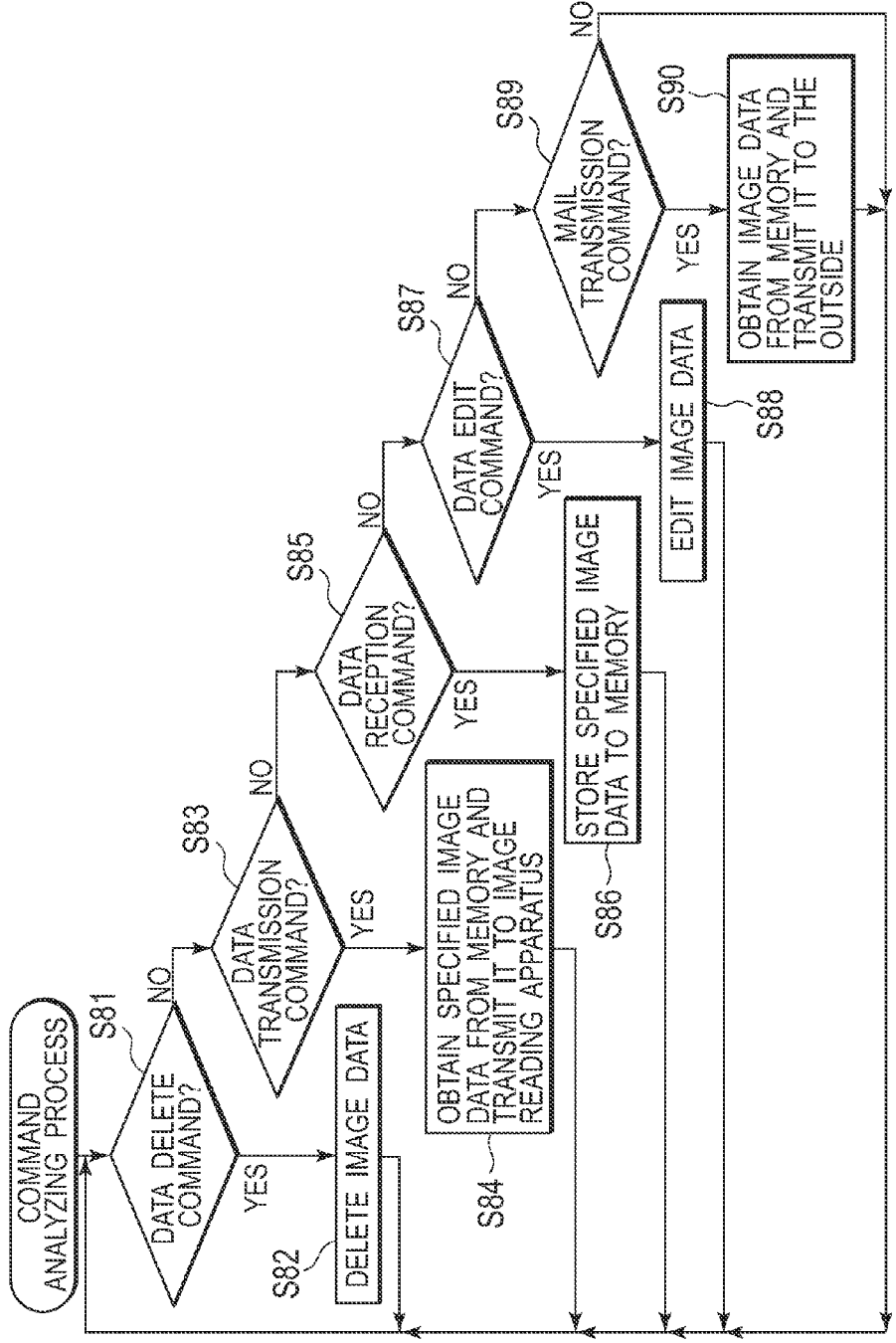
FIG. 18 is a flowchart of the command analyzing process of document server 60 shown in FIGS. 13 and 15.

FIG. 18 is a flowchart of the command analyzing process of document server 60 shown in FIGS. 13 and 15.

Upon starting the command analyzing process in document server 60, command analyzing unit 67 checks whether an image data delete command is communicated by image scanning apparatus 1B (step S81). When an image data delete command is sent (YES in step S81), command analyzing unit 67 indentifies and deletes image data stored in image data memory 66 corresponding to image ID information in informed image data delete command (step S82), and then proceeds back to step S81.

When no image data delete command is sent (NO in step S81), command analyzing unit 67 checks whether an image data transmission command is sent by image scanning apparatus 1B (step S83). When an image data transmission command is sent (YES in step S83), command analyzing unit 67 identifies, based on informed image ID information and page offset information, image data stored in image data memory 66, obtains the identified image data from image data memory 66, and transmits it to image scanning apparatus 1B (step S84). Then process proceeds back to step S81.

When no image data transmission command is sent (NO in step S83), command analyzing unit 67 checks whether an image data reception command is sent by image scanning apparatus 1B (step S85). When an image data reception command is sent (YES in step S85), command analyzing unit 67 keeps an informed image ID and an informed image data path of the image data that is to be stored into image data memory 66 and stores the image data to image data memory 66 (step S86). Then the process proceeds back to step S81.

When no image data reception command is sent (NO in step S85), command analyzing unit 67 checks whether an image data edit command is sent by image scanning apparatus 1B (step S87). When an image data edit command is sent (YES in step S87), command analyzing unit 67 obtains and edits image data stored in image data memory 66, based on primary image ID 22B, secondary image ID 23B, and an editing condition in the sent edit command (step S88). This step S8 executes the substantially same editing processes as in FIG. 8 of the first embodiment. Then the process proceeds back to step S81.

When no image data edit command is sent (NO in step S87), command analyzing unit 67 checks whether a mail transmission command is sent by image scanning apparatus 1B (step S89). When a mail transmission command is sent (YES in step S89), command analyzing unit 67 obtains image data stored in image data memory 66 corresponding to informed image ID information, and transmits the obtained image data to email server 50 from image data transmitter 68 (step S90). Then the process proceeds back to step S81.

Effects of Third Embodiment

According to the third embodiment, since document server 60 has image data memory 66, image scanning apparatus 1B does not need to have a large volume memory. Therefore, image scanning apparatus 1B is decreased in circuit size, thereby lowering the cost of image scanning apparatus 1B.

Fourth Embodiment

Configuration of Fourth Embodiment

Figure 19:
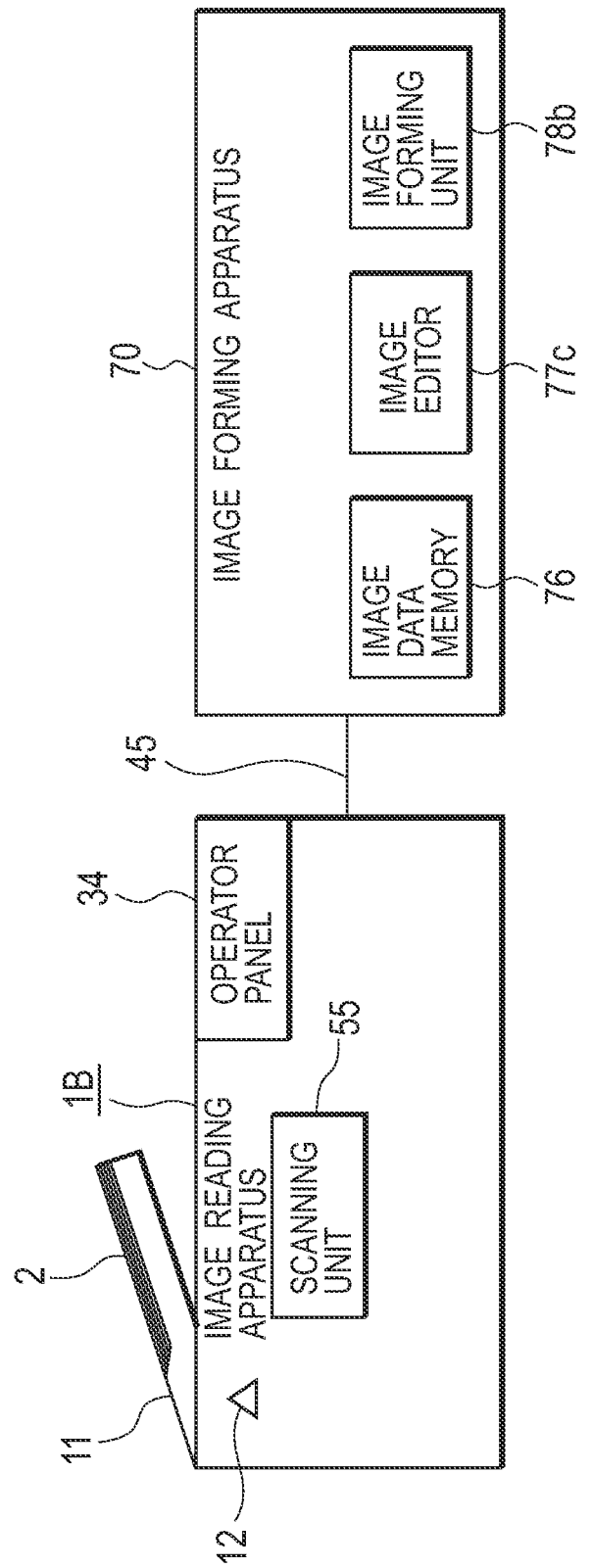
FIG. 19 is a configuration diagram of an outline of an image processing system of a fourth embodiment of the invention.

FIG. 19 is a configuration diagram of an outline of an image processing system of a fourth embodiment of the invention. In FIG. 19, the same constituents as in the first and the third embodiments are designated by the same reference numerals as in FIGS. 1 and 13.

The image processing system of the fourth embodiment includes image scanning apparatus 1B which is the same as that of the third embodiment and image forming apparatus 70 connected to image scanning apparatus 1B via network cable 45.

Image forming apparatus 70 includes: a memory (for example, image data memory 76) configured to store therein image data of document sheets scanned by image scanning apparatus 1B; an editor (for example, image editor 77c) configured to edit the image data; image forming unit 78b configured to print the image data; and the like.

Figure 20:
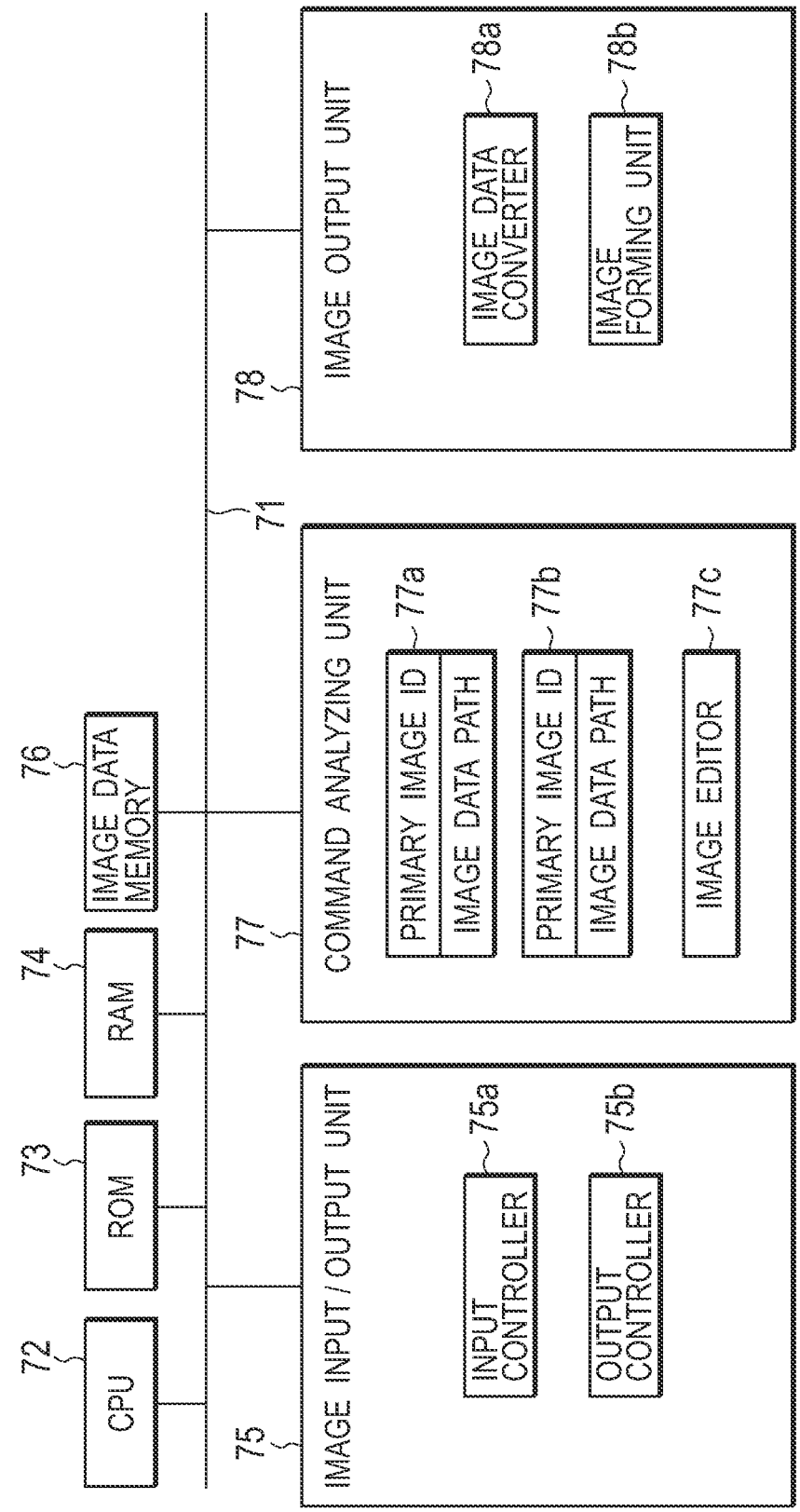
FIG. 20 is a configuration diagram of image forming apparatus 70 shown in FIG. 19.

FIG. 20 is a configuration diagram of image forming apparatus 70 shown in FIG. 19.

Image forming apparatus 70 includes internal bus 71. Connected to internal bus 71 are: CPU 72 configured to control the apparatus according to programs; ROM 73 storing therein the programs; RAM 74 configured to store therein working data; image transmission/reception unit 75 configured to transmit and receive commands and image data to and from image scanning apparatus 1B; image data memory 76 configured to store therein the image data received from image scanning apparatus 1B; command analyzing unit 77 configured to analyze the command received from image scanning apparatus 1B; and an output unit (for example, image output unit 78) configured to output the image data stored in image data memory 76 by printing the image data on a print medium (for example, a paper sheet).

Image transmission/reception unit 75 includes reception controller 75a configured to receive commands and image data from image scanning apparatus 1B, and a replay unit (for example, transmission controller 75b) configured to transmit the image data to image scanning apparatus 1B, and the like.

Command analyzing unit 77 includes: plural image data management information comprising primary image IDs 77a, 77b and image data paths (directories) to manage the relationship between image IDs transmitted from image scanning apparatus 1B and image data stored in image data memory 66; image editor 77c configured to edit, based on an image edit instruction received from image scanning apparatus 1B, the image data stored in image data memory 76; and the like.

Image output unit 78 includes image data converter 78a configured to convert the image data stored in image data memory 76 into printable data, image forming unit 78b configured to print the data converted by image data converter 78a on a paper sheet, and the like.

Scan-to-Email Process of Fourth Embodiment

Figure 21:
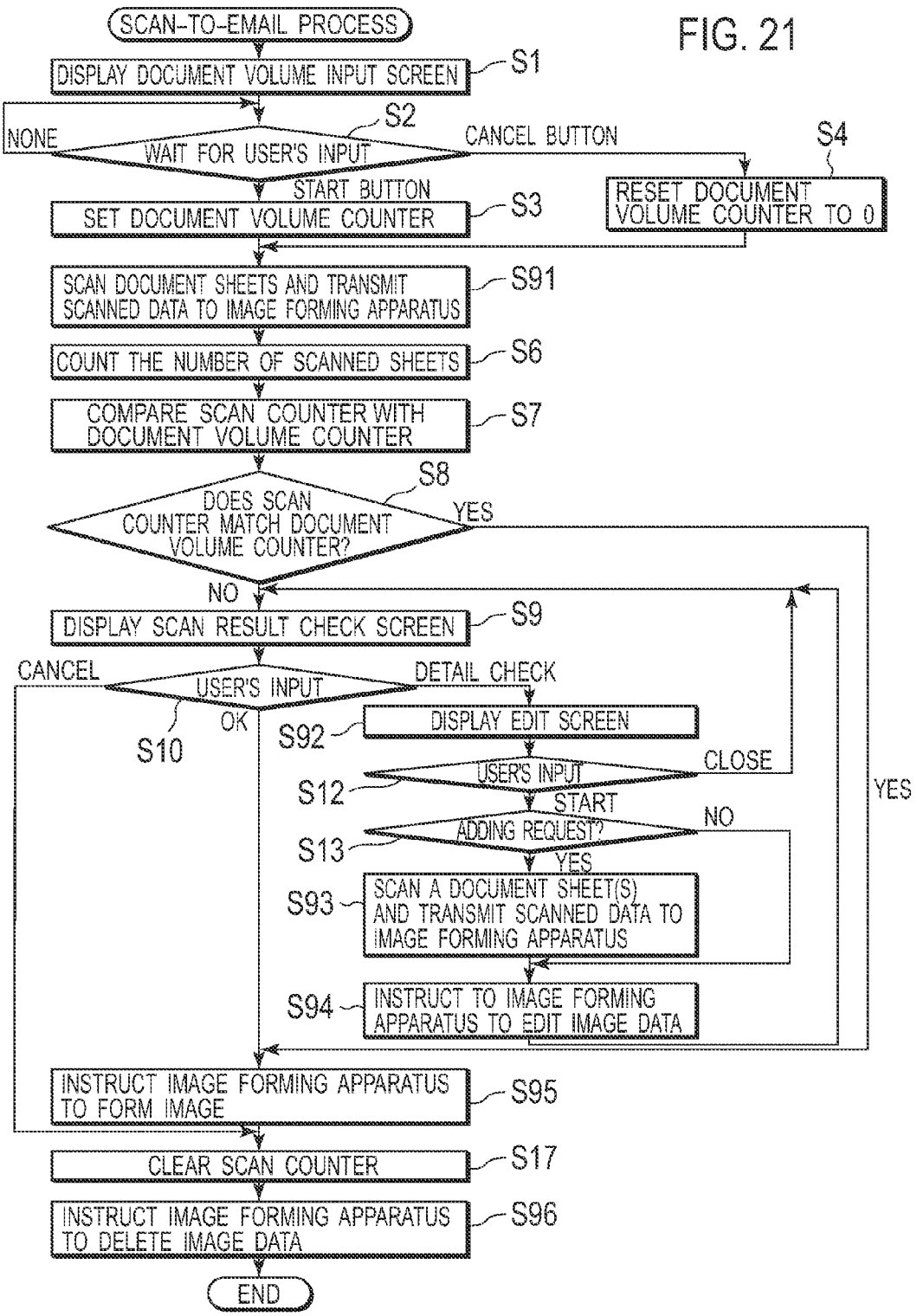
FIG. 21 is a flowchart of an outline of a scanning process (scan-to-email process) of the image processing system shown in FIGS. 19 and 20.

FIG. 21 is a flowchart of an outline of a scanning process (scan-to-email process) of the image processing system shown in FIGS. 19 and 20. In FIG. 21, the same constituents as the first embodiment are designated by the same reference numerals as in FIG. 6 of the first embodiment.

In the flowchart of FIG. 21 of the fourth embodiment, the processes of steps S91 to S96 are different from the flowchart of FIG. 6 of the first embodiment.

When the user uses operator panel 34 to execute a scan-to-email process in image scanning apparatus 1B shown in FIGS. 19 and 20, image scanning apparatus 1B executes steps S1 to S4 that are the same as in the first embodiment and then proceeds to step S91.

In step S91, output determination unit 20B creates image ID information as primary image ID 22B for primary image data and stores primary image ID 233, and then instructs image input unit 10 to scan document sheets 2. Upon being instructed to scan document sheets 2, image input unit 10 controls ADF 11, sensor 12, and scanning unit 13 so as to scan document sheets 2. Output determination unit 20B makes a data transmission command by attaching primary image ID 22B to the image data of scanned document sheets 2, and transmits the data transmission command from image transmission reception unit 40B to image forming apparatus 70.

After the transmission, the processes of steps S6 to S10 are executed in substantially same way as in the first embodiment, and then the process proceeds to step S92.

In step S92, in a way similar to the first embodiment, when detecting that detail check button 52d of FIG. 4 is pressed in step S10, scan result check screen display controller 32 informs output determination unit 208 that an image data display request is instructed. When receiving the instruction of the image data display request, output determination unit 20B informs operator panel controller 30 of primary image ID 22B and instructs operator panel controller 30 to display an edit screen. When being instructed to display the edit screen, operator panel controller 30 instructs edit screen display controller 31 to display edit screen 53 of FIG. 5. When being instructed to display edit screen 53, edit screen display controller 31 displays edit screen 53 of FIG. 5, and then proceeds to step S12.

Step S12 waits for an input from the user on edit screen 53 of FIG. 5 (that is, waits for press of start button 53g or close button 53h), and proceeds to step S13 when start button 53g is pressed. In step S13, output determination unit 20B, which receives the edit request, determines whether or not the editing condition includes an add command in the same way or similar to the first embodiment. When there is an add command in the editing condition, the process proceeds to step S93 and, on the other hand, when there is no add command, the process proceeds to step S94.

In step S93, output determination unit 20B creates image ID information as secondary image ID 23B for secondary image data (re-scanned image data) and holds secondary image ID 23B, and then instructs image input unit 10 to scan document sheet(s) 2. Upon receiving the scanning instruction, image input unit 10 controls ADF 11, sensor 12, and scanning unit 13 so as to scan the document sheet(s). Then, output determination unit 20B creates a data transmission command by attaching secondary image ID 23B to the image data of the scanned document sheet(s), and transmits the data transmission command from image transmission reception unit 40B to image forming apparatus 70. Then, the process proceeds to step S94.

In step S94, output determination unit 20B transmits an image data edit command including the editing condition, primary image ID 22B, and secondary image ID 23B, which are obtained from edit screen display controller 31, to image forming apparatus 70 via image transmission reception unit 40B. After the transmission, the process proceeds back to steps S9 and S10 in the same way as the first embodiment. Step S10 waits for an input from the user on scan result check screen 52 of FIG. 4 (that is, waits for press of cancel button 52b or OK button 52c of FIG. 4). When OK button 52c is pressed, the process proceeds to step S95 and, on the other hand, when cancel button 52b is pressed, the process proceeds to step S17.

In step S95, output determination unit 20B transmits an image forming command to image forming apparatus 70 via image transmission reception unit 40B and then proceeds to step S17. In step S17, output determination unit 20B clears scan counter 14 in the way same as or similar to the first embodiment and then proceeds to step S96.

In step S96, output determination unit 20B transmits an image data delete command including primary image ID 22B and secondary image ID 23B to image forming apparatus 70 via image transmission reception unit 40B and then ends the process.

(Edit Screen Displaying Process (Step S92) in FIG. 21)

Figure 22:
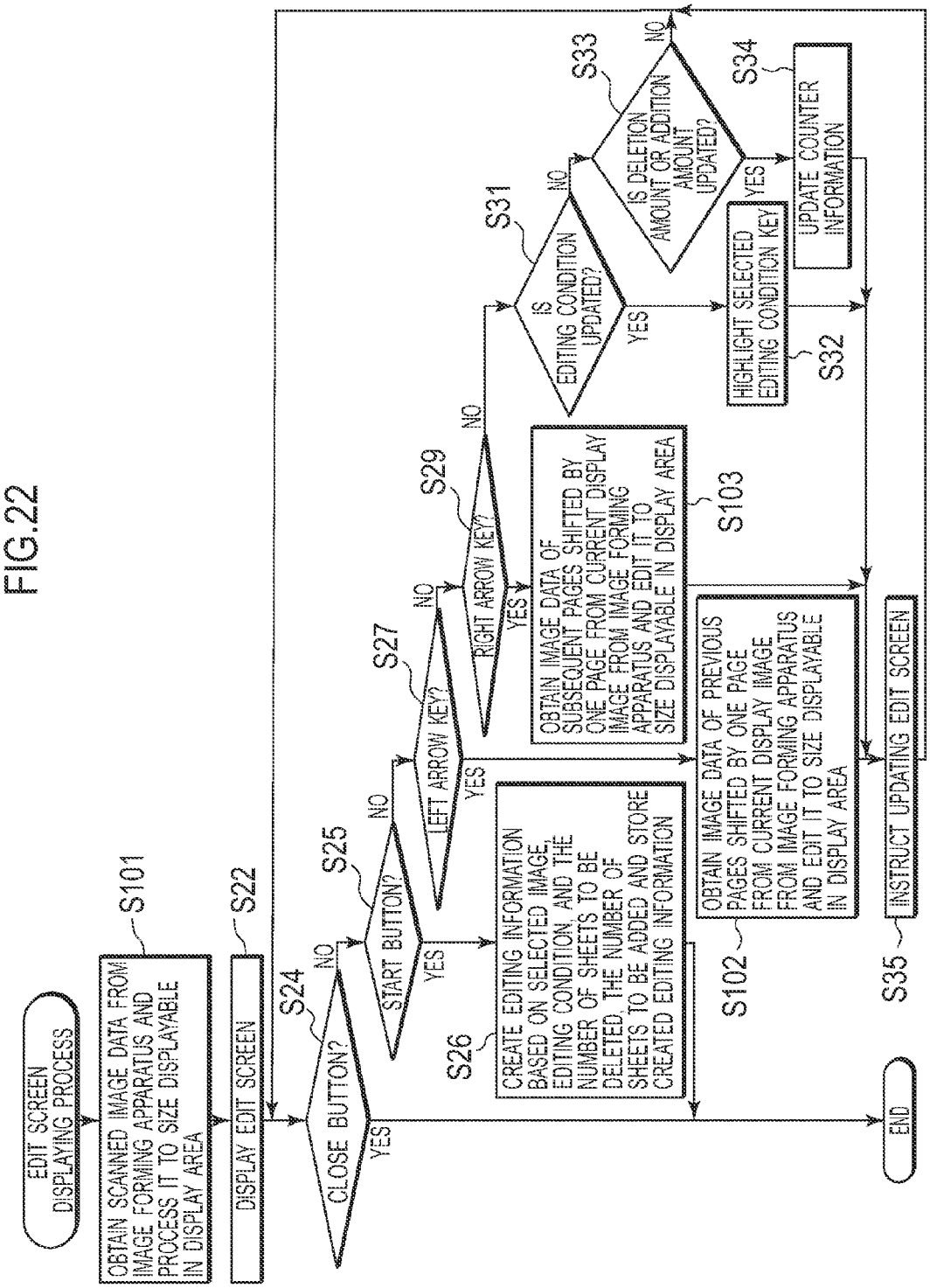
FIG. 22 is a flowchart of an edit screen displaying process (step S92) shown in FIG. 21.

FIG. 22 is a flowchart of an edit screen displaying process (step S92) shown in FIG. 21. In FIG. 22, the same constituents as the first embodiment are designated by the same reference numerals as in FIG. 7 of the first embodiment.

The flowchart of FIG. 22 of the fourth embodiment has processes of steps S101 to S103 which are different from the flowchart in FIG. 7 of the first embodiment.

Upon starting the edit screen displaying process, edit screen display controller 31 proceeds to step S101. In step S101, edit screen display controller 31 requests image control command generating unit 26 to obtain a display image displayable in image display area 53b of edit screen 53 of FIG. 5 as specifying the display size, the display resolution, and primary image ID 22 received from output determination unit 20. When being requested to obtain the display image, image control command generating unit 26 issues an image data transmission command to image forming apparatus 70 via image transmission reception unit 40B, obtains corresponding image data and transmits it to edit screen display controller 31. That is, step S101 obtains the image data of the scanned document sheets from image forming apparatus 70, processes it into the size displayable in image display area 53b of edit screen 53 of FIG. 5, and then proceeds to step S22.

Like the first embodiment, in step S22, edit screen display controller 31 displays, in image display area 53b, the display image that is obtained by image control command generating unit 26. After that, steps S24 to S27, which are the same as those of the first embodiment, are executed. In step S27, when left arrow key 53c is pressed in edit screen 53 of FIG. 5 (YES in step S27), the process proceeds to step S102 and, on the other hand, when left arrow key 53c is not pressed (NO in step S27), the process proceeds to step S29.

Like step S101, in step S102, edit screen display controller 31 obtains, from image forming apparatus 70 through image control command generating unit 26, image data of the previous page of the display image currently displayed in image display area 53b of edit screen 53 of FIG. 5, and then proceeds to step S35. That is, step S102 obtains the image data of previous page of the display image currently displayed in image display area 53b and processes it to the size displayable in image display area 53b, and then proceeds to step S35.

Step S35 instructs update of the display image in image display area 53b of edit screen 53 of FIG. 5 in the same way as the first embodiment and then proceeds back to step S24. In step S29, right arrow key 53d is pressed in edit screen 53 of FIG. 5 (YES in step S29), the process proceeds to step S103 and, on the other hand, when right arrow key 53d is not pressed (NO in step S29), the process proceeds to step S31.

In step S103, like step S101, edit screen display controller 31 obtains, from image forming apparatus 70 via image control command generating unit 26, image data of the subsequent page of the display image currently displayed and processes it to the size displayable to image display area 53b. Then the process proceeds to step S35.

After step S29, the processes from steps S31 to S35 are executed in the substantially same way as in the first embodiment.

(Command Analyzing Process of Image Forming Apparatus)

Figure 23:
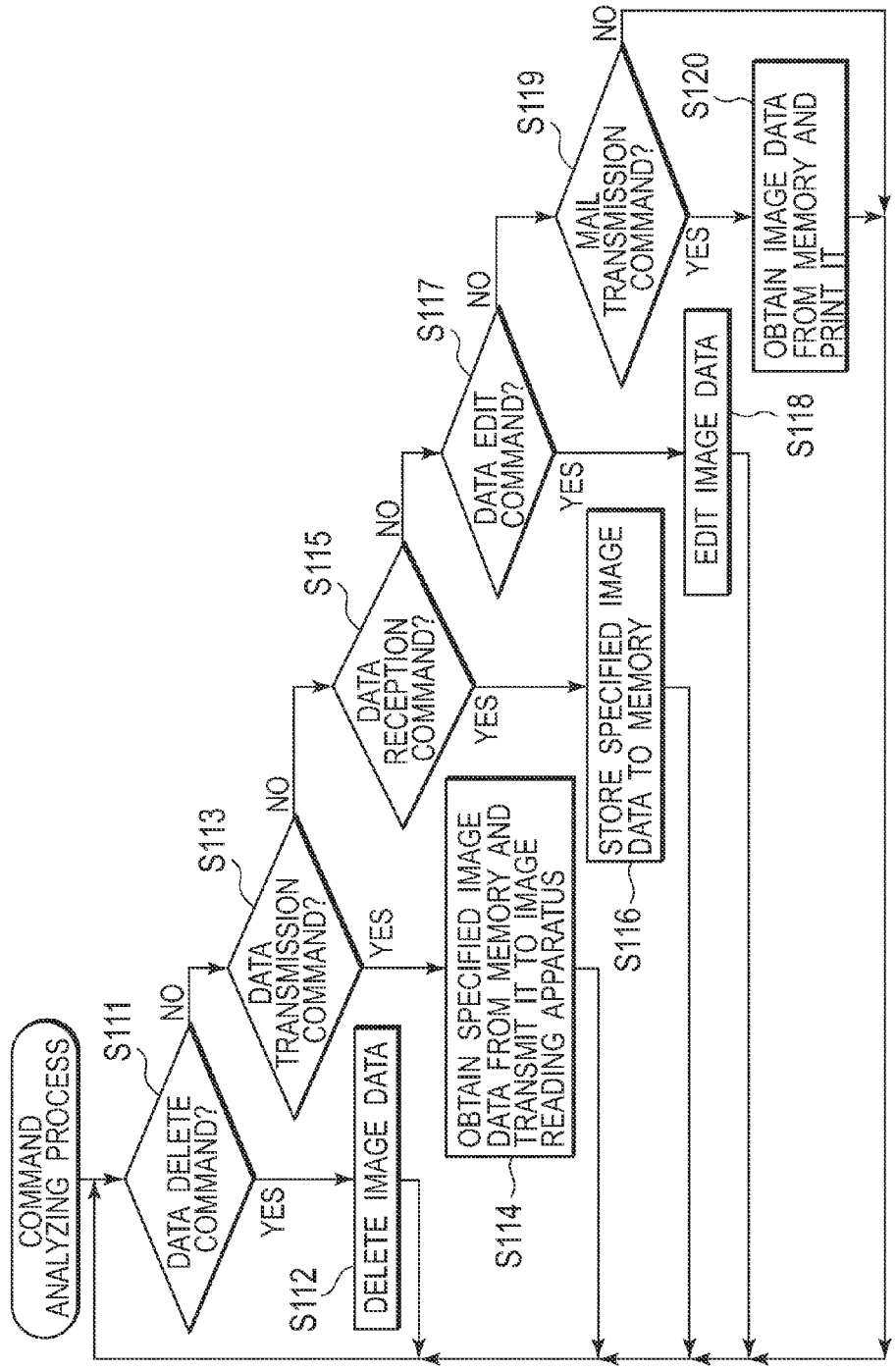
FIG. 23 is a flowchart of a command analyzing process of image forming apparatus 70 shown in FIGS. 19 and 20.

FIG. 23 is a flowchart of the command analyzing process of image forming apparatus 70 shown in FIGS. 19 and 20.

Upon starting the command analyzing process in image forming apparatus 70, command analyzing unit 77 checks whether an image data delete command is sent by image scanning apparatus 1B (step S111). When an image data delete command is sent (YES in step S111), command analyzing unit 77 identifies and deletes the image data stored in image data memory 76 corresponding to image ID information in sent image data delete command (step S112), and then proceeds back to step S111.

When no image data delete command is sent (NO in step S111), command analyzing unit 77 checks whether an image data transmission command is sent by image scanning apparatus 1B (step S113). When an image data transmission command is sent (YES in step S113), command analyzing unit 77 identifies image data stored in image data memory 76 based on informed image ID information and page offset information, obtains the identified image data from image data memory 76, and transmits it to image scanning apparatus 1B (step S114). Then the process proceeds back to step S111.

When no image data transmission command is sent (NO in step S113), command analyzing unit 77 checks whether an image data reception command is sent by image scanning apparatus 1B (step S115). When an image data reception command is sent (YES in step S115), command analyzing unit 77 holds an informed image ID and an informed image data path of image data that is to be stored into image data memory 76 and stores the image data to image data memory 76 (step S116). Then the process proceeds back to step S111.

When no image data reception command is sent (NO in step S115), command analyzing unit 77 checks whether an image data edit command is sent by image scanning apparatus 1B (step S117). When an image data edit command is sent (YES in step S117), command analyzing unit 77 obtains and edits image data stored in image data memory 76, based on primary image ID 22B, secondary image ID 23B, and an editing condition in the informed image data edit command (step S118). Note that step 118 executes the substantially same editing processes as in FIG. 8 of the first embodiment. Then the process proceeds back to step S111.

When no image data edit command is sent (NO in step S117), command analyzing unit 77 checks whether a print command is sent by image scanning apparatus 1B (step S119). When a print command is sent (YES in step S119), command analyzing unit 77 obtains image data stored in image data memory 76 corresponding to informed image ID information, and transmits the obtained image data to image output unit 78. Image data converter 78 converts the transmitted image data into data processable by image forming unit 78b, and image forming unit 78b prints the converted data on paper sheets (step S120). Then, the process proceeds back to step S111.

Effect of Fourth Embodiment

The fourth embodiment eliminates the user's manual operation of inserting a page that was not scanned and printed due to an overlapped feed in copying in sorting mode, for example.

(Modifications)

The invention is not limited to the above first to fourth embodiments and covers various alterations and modifications of the invention. The modifications include the following examples (a), (b), or the like.

Figure 24:
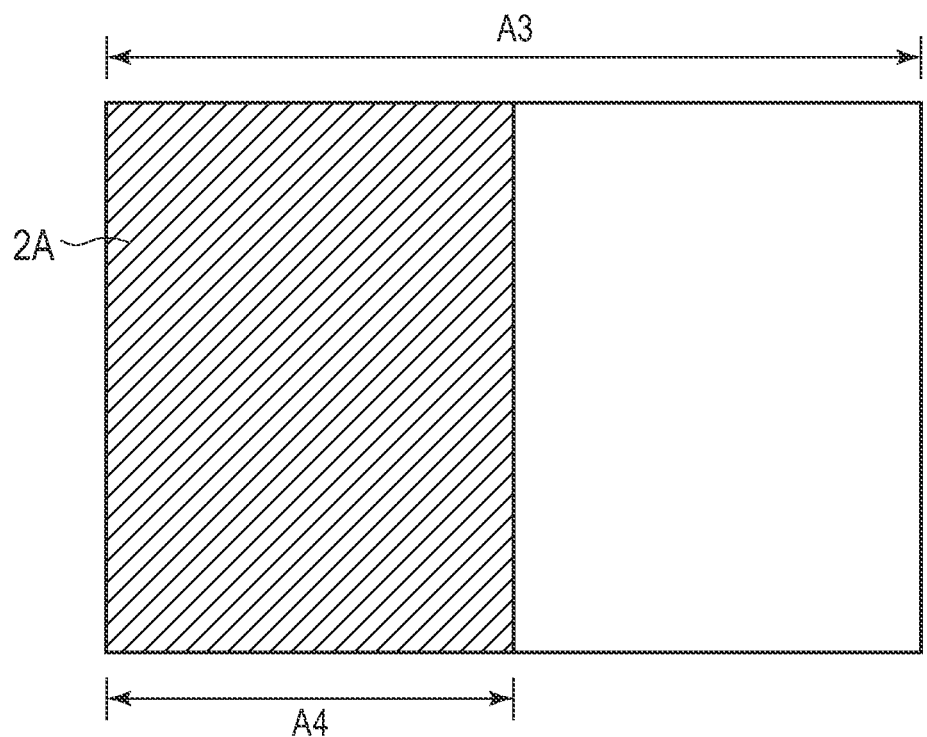
FIG. 24 is a view of an example of a copy of a document.

(a) FIG. 24 is a view of an example of a document.

Although the above embodiments scan document sheets 2 that have the same size (for example, A4 size), the invention can be applied to a mixed document scan mode wherein document 2A includes sheets of different sizes (for example, A4-size and A3-size) as shown in FIG. 24.

(b) Image scanning apparatus 1, 1A, and 1B, document server 60, and image forming apparatus 70 may be modified into a configuration that is not illustrated in the drawings and the processes thereof may be modified into a flow that is not illustrated in the drawings.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image scanning apparatus comprising:
a document feeder configured to sequentially feed document sheets stacked in the document feeder;
an image scanning unit configured to scan the document sheets fed by the document feeder and to output image data thereof;
a memory configured to store therein the image data;
a detector configured to detect, as a feeding failure, an overlapped feed wherein two or more overlapped sheets are fed at once by the document feeder;
a notifier configured to report the feeding failure when the detector detects the feeding failure; and
a display unit configured to display the image data stored in the memory, upon detection of the feeding failure.

2. The image scanning apparatus according to claim 1, wherein
the detector includes: a counter input unit configured to input the number of document sheets to be scanned, and a counter configured to count the number of document sheets scanned by the image scanning unit, wherein the detector determines that the feeding failure occurs when the number input by the counter input unit is not the same as the number counted by the counter.

3. The image scanning apparatus according to claim 2, wherein
the counter input unit comprises a volume input screen to let a user input the number of document sheets.

4. The image scanning apparatus according to claim 1, further comprising:
an overlapped feed detector configured to detect a position where the overlapped feed occurred,
wherein the image data is displayed such that the position where the overlapped feed occurred is centered and highlighted in the display unit.

5. The image scanning apparatus according to claim 1, further comprising:
an edit information input unit configured to receive an input of edit information for editing the image data of the document sheets output by the image scanning unit;
an image re-scanning unit configured to scan one or more sheets of the document that are returned to and re-fed by the document feeder and to output re-scanned image data thereof; and
an editor configured to edit, based on the input edit information, the image data that are stored in the memory, using the rescanned image data that are output from the image re-scanning unit.

6. An image processing system comprising an image scanning apparatus and an image processing apparatus,
the image scanning apparatus including:
a document feeder configured to sequentially feed document sheets stacked in the document feeder;
an image scanning unit configured to scan the document sheets fed by the document feeder and to output image data thereof;
a transfer unit configured to transfer the image data output by the image scanning unit to the image processing apparatus;
a detector configured to detect, as a feeding failure, an overlapped feed wherein two or more overlapped sheets are fed at once by the document feeder;
a notifier configured to report the feeding failure when the detector detects the feeding failure;
a display unit configured to, when the detector detects the feeding failure, obtain the image data from the image processing apparatus and to display the image data;
an edit information input unit configured to receive an input of editing information for editing the image data of the document sheets output by the image scanning unit, as the display unit displays the image data;

an image re-scanning unit configured to scan one or more sheets of the document that are returned to and re-fed by the document feeder and to output re-scanned image data thereof; and an informer configured, when the edit information input unit receives the input of the edit information, to inform the image processing apparatus of the edit information, the image processing apparatus including:
a memory configured to store therein the image data transferred from the image scanning apparatus;
a reply unit configured, when the image scanning apparatus requests the image data, to transmit the image data to the image scanning apparatus;
an editor configured, when being informed of the edit information by the informer of the image scanning apparatus, to edit, based on the edit information, the image data stored in the memory using the re-scanned image data output by the image re-scanning unit; and
an output unit configured to output to an external apparatus the edited image data edited by the editor.

7. An image processing system comprising an image scanning apparatus and an image forming apparatus, the image scanning apparatus including:
a document feeder configured to sequentially feed document sheets, stacked in the document feeder;
an image scanning unit configured to scan the document sheets fed by the document feeder and to output image data thereof;
a transfer unit configured to transfer the image data output from the image scanning unit to the image forming apparatus;
a detector configured to detect, as a feeding failure, an overlapped feed wherein two or more overlapped sheets are fed at once by the document feeder;
a notifier configured to report the feeding failure when the detector detects the feeding failure;
a display unit configured to, when the detector detects the feeding failure, obtain the image data from the image forming apparatus and to display the image data;
an edit information input unit configured to receive an input of editing information for editing the image data of the document sheets output from the image scanning unit, as the display unit displays the image data;
an image re-scanning unit configured to scan one or more sheets of the document that are returned to and re-fed by the document feeder after the edit information input unit receives the input of the edit information and to output re-scanned image data thereof; and
an informer configured, when the edit information input unit receives the input of the edit information, to inform the image forming apparatus of the edit information, the image forming apparatus including:
a memory configured to store therein the image data transferred from the image scanning apparatus;
a reply unit configured, when the image scanning apparatus requests the image data, to transmit the image data to the image scanning apparatus;
an editor configured, when being informed of the edit information by the informer of the image scanning apparatus, to edit, based on the edit information, the image data stored in the memory using the re-scanned image data output by the image re-scanning unit; and
an output unit configured to print the edited image data edited by the editor.

* * * * *